United States Patent
Takeuchi et al.

(10) Patent No.: US 9,298,388 B2
(45) Date of Patent: Mar. 29, 2016

(54) COMPUTER SYSTEM, DATA MANAGEMENT APPARATUS, AND DATA MANAGEMENT METHOD

(75) Inventors: Naoki Takeuchi, Odawara (JP); Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 675 days.

(21) Appl. No.: 13/641,291

(22) PCT Filed: Jul. 26, 2012

(86) PCT No.: PCT/JP2012/004757
§ 371 (c)(1),
(2), (4) Date: Oct. 15, 2012

(87) PCT Pub. No.: WO2014/016872
PCT Pub. Date: Jan. 30, 2014

(65) Prior Publication Data
US 2014/0032838 A1    Jan. 30, 2014

(51) Int. Cl.
*G06F 12/00* (2006.01)
*G06F 3/06* (2006.01)

(52) U.S. Cl.
CPC .............. *G06F 3/0647* (2013.01); *G06F 3/067* (2013.01); *G06F 3/0607* (2013.01)

(58) Field of Classification Search
CPC ........ G06F 3/0647; G06F 3/607; G06F 3/067
See application file for complete search history.

(56) References Cited

U.S. PATENT DOCUMENTS

| | | | |
|---|---|---|---|
| 2006/0095666 A1* | 5/2006 | Furuhashi et al. | 711/114 |
| 2008/0005508 A1* | 1/2008 | Asano | G06F 3/0605 711/161 |
| 2010/0318579 A1 | 12/2010 | Satoyama et al. | |
| 2011/0225117 A1 | 9/2011 | Nakanishi et al. | |

FOREIGN PATENT DOCUMENTS

JP    2008-040571 A    2/2008

* cited by examiner

*Primary Examiner* — Kalpit Parikh
(74) *Attorney, Agent, or Firm* — Volpe and Koenig, P.C.

(57) ABSTRACT

A data management apparatus of a computer system comprises, as a retention rule for volume data, change-time identification information for identifying a point-in-time for changing a logical unit, and migration-destination unit specification information for specifying a migration-destination logical unit. An edge storage apparatus stores first identification information, which enables the identification of volume data in a logical unit, and second identification information, which enables the identification of a logical unit in a storage system after associating the first identification information and the second identification information with each other. A data management apparatus (A1) transfers the volume data from a migration-source logical unit to the migration-destination logical unit conforming to the migration-destination unit specification information subsequent to a point-in-time identified in accordance with the change-time identification information. The edge storage apparatus (B1) associates the second identification information, which enables the identification of the migration-destination logical unit, with the first identification information, and stores the associated information in a storage device.

9 Claims, 33 Drawing Sheets

Fig.4

| WWN# | LUN# |
|---|---|
| WWN1 | LUN1 |
| WWN1 | LUN2 |

401 → WWN#
402 → LUN#
34101

Retention LU management table

Fig.7

| LVOL# | WWN# | LUN# | EdgeStrage ID |
|---|---|---|---|
| LVOL1 | WWN1 | LUN1 | EdgeStrage 1 |
| | | | |
| | | | |

Coupled LU management table

Fig.10

| WWN# | LUN# | GDEV# | Performance | Bit cost | Data (yes/no) |
|---|---|---|---|---|---|
| WWN1 | LUN1 | 100 | High | High | 1 (yes) |
| WWN1 | LUN2 | 101 | Low | Low | 0 (no) |
| ... | ... | ... | ... | ... | ... |
| WWN2 | LUN2 | 110 | High | High | 1 (yes) |
| WWN3 | LUN3 | 111 | High | High | 1 (yes) |
| WWN3 | LUN5 | 112 | Low | Low | 0 (no) |

LU information management table

Fig.11

902 Input parameter management table

| WWN# | LUN# | Data name | Time period | Performance (within-period) | Bit cost (within-period) | Protection level (within-period) | Performance (post-period) | Bit cost (post-period) | Protection level (post-period) |
|---|---|---|---|---|---|---|---|---|---|
| WWN1 | LUN1 | AAA | 30 | High | High | NULL | Low | Low | NULL |
| WWN2 | LUN2 | BBB | 20 | High | High | Duplicate | Low | Low | Single |
| WWN3 | LUN3 | BBB | 20 | High | High | Duplicate | Low | Low | Single |
|  |  |  |  |  |  |  |  |  |  |
|  |  |  |  |  |  |  |  |  |  |

| WWN# | LUN# | GDEV# | Identical-data management ID |
|---|---|---|---|
| WWN2 | LUN2 | 110 | 10 |
| WWN3 | LUN3 | 111 | 10 |
| | | | |

1201  1202  1203  1204

Identical-data management table

Fig.13

| WWN# | LUN# | EdgeStorage ID |
|---|---|---|
| WWN1 | LUN1 | EdgeStorage1 |
| WWN2 | LUN2 | EdgeStorage2 |
| WWN3 | LUN3 | EdgeStorage3 |
| ... | ... | ... |

Edge storage management table 904
1301
1302
1303

Fig.14

| WWN# | LUN# | Storage ID |
|---|---|---|
| WWN1 | LUN1 | Storage 1 |
| WWN2 | LUN2 | Storage 2 |
| WWN3 | LUN3 | Storage 3 |
| ... | ... | ... |

905
1401 1402 1403

Storage management table

COMPUTER SYSTEM, DATA MANAGEMENT APPARATUS, AND DATA MANAGEMENT METHOD

TECHNICAL FIELD

The present invention relates to technology for managing data in a logical storage space built using multiple storage apparatuses.

BACKGROUND ART

Generally speaking, a method for virtualizing a logical storage area of multiple storage apparatuses in a storage system as a single storage resource is known. In a storage system such as this, a virtual logical storage space built using multiple storage apparatuses is referred to as a storage cloud.

Furthermore, in general, various types of physical storage apparatuses (a magnetic disk and flash memory) having a variety of attributes exists as storage apparatuses in a storage system. In the storage system, high-performance, high-reliability, high-cost storage apparatuses are used together with low-performance, low-reliability, low-cost storage apparatuses in accordance with the application. Specifically, frequently used data is stored in a physical storage area of a high-cost storage apparatus, and data archives and other such infrequently used data is stored in the physical storage area of a low-cost storage apparatus.

In the storage cloud, a logical storage space can be hierarchized using multiple logical units (LU) based on multiple storage apparatuses having various attributes. In the storage cloud, data based on an IO request (either a read request or a write request) from a host computer is stored in any of multiple LUs, and data is provided in accordance with the IO request from the host computer. In the storage cloud, in which the logical storage space is hierarchized, the data inside a LU comprising this logical storage space (hereinafter, referred to as volume data) is migrated to another LU in accordance with how often it is accessed.

CITATION LIST

Patent Literature

[PTL 1]
Japanese Patent Application Laid-open No. 2008-40571

SUMMARY OF INVENTION

Technical Problem

In the above-mentioned prior-art storage system, when the volume data inside the storage cloud is migrated to a different LU so that the host computer can appropriately use the volume data in the storage cloud, the host computer must be aware of this migration and must change an access destination for the volume data appropriately. Also, in a case where the volume data is migrated to different LUs across storage apparatuses, the host computer must suspend an application, which is using the volume data, to perform a setting change. Thus, the fact that work must be suspended during a volume data migration is inefficient, and the likelihood of a human error occurring during the host computer setting change is undeniable.

As a method for solving this problem, there is a method, which makes use of alternate path software and other such software functions installed in the host computer side (for example, refer to Patent Literature 1).

However, the problem is that a method, which uses software functions, is dependent on the OS running on the host computer.

Solution to Problem

To solve the above problem, a computer system related to an aspect of the present invention comprises one or more host computers, one or more physical storage apparatuses, one or more storage systems comprising multiple storage apparatuses having one or more logical units based on one or more physical storage apparatuses, one or more edge storage apparatuses, which are coupled between a host computer and the storage system corresponding to one host computer, and a data management apparatus for managing the volume data stored in the multiple storage apparatus logical units of the storage system.

A storage device of the data management apparatus stores a retention rule for the volume data, and the retention rule comprises change-time identification information for identifying a point-in-time for changing the logical unit, which constitutes the volume data retention destination, and migration-destination unit definition information for defining a migration-destination logical unit for the volume data.

A storage device of the edge storage apparatus stores first identification information, which enables the host computer to identify the volume data of a logical unit, and second identification information, which makes it possible to identify a volume data-storing logical unit in the storage system after associating, after associating the first identification information and the second identification information with each other.

A control device of the data management apparatus (A1) transfers the volume data from a migration-source logical unit, which is storing the volume data, to a migration-destination logical unit corresponding to the migration-destination unit definition information subsequent to the point-in-time identified in accordance with the change-time identification information.

A control device of the edge storage apparatus (B1) associates the second identification information, which makes it possible to identify the migration-destination logical unit, with the first identification information, which makes it possible to identify the volume data, and stores the associated information in the edge storage apparatus storage device.

BRIEF DESCRIPTION OF DRAWINGS

FIG. 1 shows the configuration of a computer system related to Example 1.
FIG. 2 shows the configuration of a portion of a storage system 40.
FIG. 3 is a diagram showing the configuration of a SM 341.
[FIG. 4]
FIG. 4 is diagram of a retention LU management table 34101.
FIG. 5 is a diagram showing the configuration of an edge storage 20.
FIG. 6 is a diagram showing the configuration of a SM 241.

[FIG. 7]
FIG. 7 is a diagram showing a coupled LU management table 601.
FIG. 8 is a diagram showing the configuration of a data management apparatus 50.
FIG. 9 is a diagram showing the configuration of a memory 52.
[FIG. 10]
FIG. 10 is a diagram showing a LU information management table 901.
[FIG. 11]
FIG. 11 is a diagram showing an input parameter management table 902.
[FIG. 12]
FIG. 12 is a diagram showing an identical-data management table 903.
[FIG. 13]
FIG. 13 is a diagram showing an edge storage management table 904.
[FIG. 14]
FIG. 14 is a diagram showing a storage management table 905.
FIG. 15 is a flowchart of initialization processing.
FIG. 16 is a first flowchart of input processing.
FIG. 17 is a second flowchart of input processing.
FIG. 18 is a flowchart of GDEV search processing.
FIG. 19 is a flowchart of identical-data management processing.
FIG. 20 is a first flowchart of post-period GDEV selection processing.
FIG. 21 is a second flowchart of post-period GDEV selection processing.
FIG. 22 is a flowchart of data retention period monitoring processing.
FIG. 23 is a first flowchart of change retention rule processing related to Example 1.
FIG. 24 is a second flowchart of change retention rule processing related to Example 1.
FIG. 25 is a third flowchart of change retention rule processing related to Example 1.
FIG. 26 is a flowchart of table update processing.
FIG. 27 shows an example of a retention rule input screen.
FIG. 28 shows an example of a GDEV list display screen.
FIG. 29 shows an example of an error display screen.
FIG. 30 is a first flowchart of change retention rule processing related to a second example.
FIG. 31 is a second flowchart of change retention rule processing related to Example 2.
FIG. 32 is a third flowchart of change retention rule processing related to Example 2.
FIG. 33 is a diagram for illustrating a storage cloud.

DESCRIPTION OF EMBODIMENTS

Figure 1:
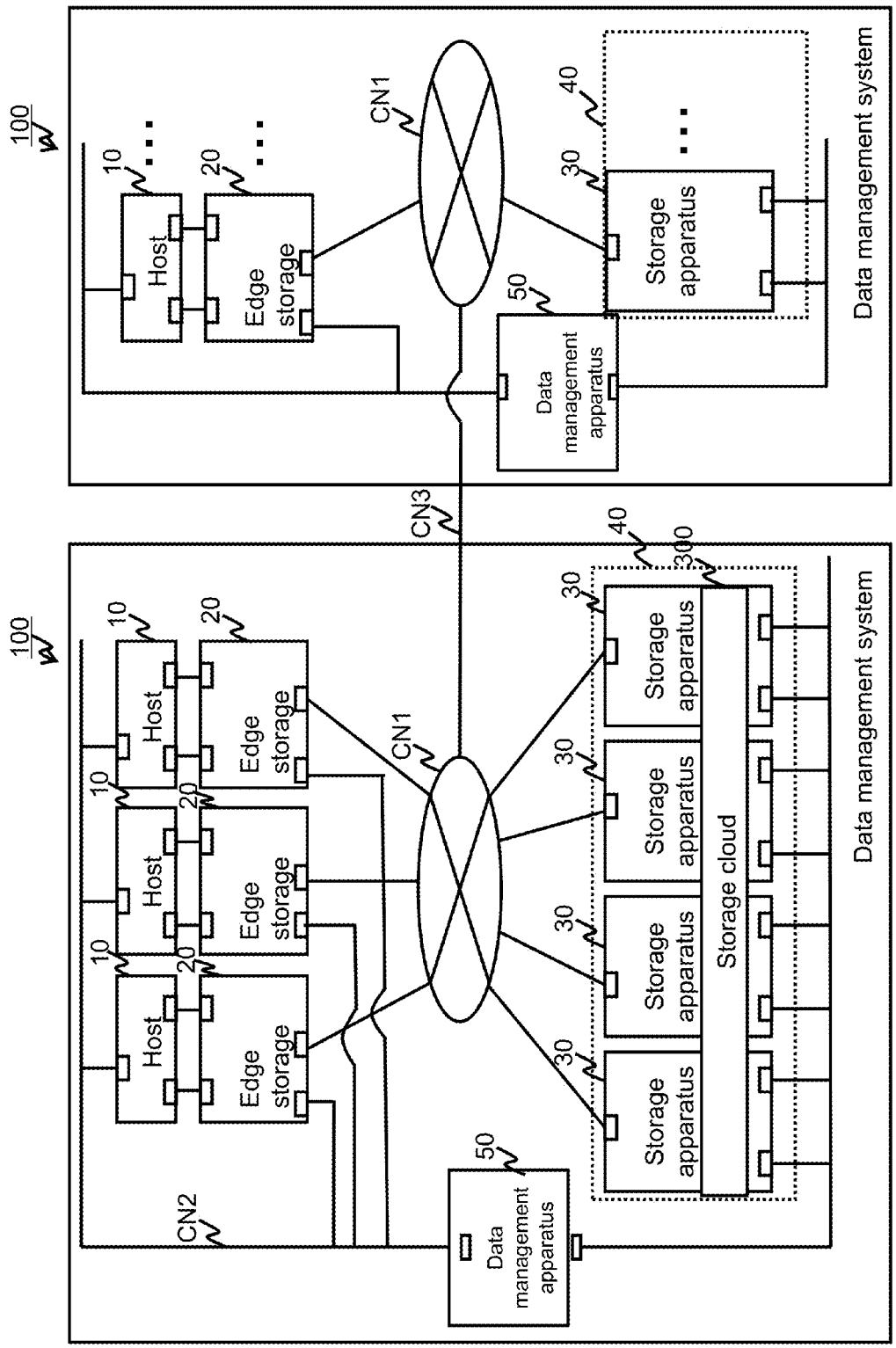
[FIG. 1]

A number of examples of the present invention will be explained below.

In the following explanation, various information may be explained using the expression "aaa table", but the various information may also be expressed using a data structure other than a table. Therefore, to show that the various information is not dependent on the data structure, "aaa table" can be called "aaa information".

Furthermore, in the following explanation, there may be cases where an ID (identifier), a number, or the like is used as information for identifying a target of one sort or another instead of a drawing reference sign. However, information for identifying a target of some sort is not limited to an ID (identifier), a number, or the like, and another type of identification information may be used.

In the following explanation, there may be cases where an entity performing a process is explained as being the "data management apparatus", the "storage apparatus", or the "edge storage apparatus". However, this processing may be performed by the control part of the "data management apparatus", the "storage apparatus", or the "edge storage apparatus". That is, the processing may be performed in accordance with the CPU of the data management apparatus, or the disk controller (for example, a MPB, which will be explained further below) of the storage apparatus or the edge storage apparatus executing a prescribed program.

Furthermore, in the following explanation, there may be cases where an explanation is given using a "program" as the doer of the action, but since the specified processing is performed in accordance with a program being executed by a processor (for example, a CPU (Central Processing Unit)) while using a storage resource (for example, a memory) and/or a communication interface processor (for example, a communication port), the processor may be regarded as the doer of the processing. A process, which is explained having a program as the doer of the action, may be regarded as a process performed by a device comprising a processor (for example, the data management apparatus, the storage apparatus, or the edge storage apparatus). Furthermore, either all or a portion of the processing performed by the processor may be carried out by a hardware circuit. A computer program may be installed in various computers from a program source.

Also, in the following explanation, a communication interface apparatus may be abbreviated as "I/F".

The data management apparatus may comprises one or more computers. Specifically, for example, in a case where a computer displays information, or in a case where a computer sends display information to another computer, this computer is the data management apparatus. Furthermore, for example, in a case where functions identical to those mentioned above are realized using multiple computers, the relevant multiple computers (may include a display computer in a case where the display computer performs the displaying) is the data management apparatus.

EXAMPLE 1

<Overview of Example 1>

An overview of Example 1 will be explained.

A computer system related to this example comprises one or more data management systems 100 (refer to FIG. 1). The data management system 100 comprises multiple host computers (referred to as host hereinbelow) 10, a storage system 40 comprising multiple storage apparatuses 30, a data management apparatus 50 for processing data stored in the storage system 40, and one or more edge storage apparatuses (referred to as edge storage hereinbelow) 20. An edge storage 20 is associated with each host 10 on a one-to-one basis. The edge storage 20, based on an IO request from the host 10, sends an IO command (either a read command or a write command) to the storage apparatus 30, which comprises the LU specified in the IO request.

Figure 33:
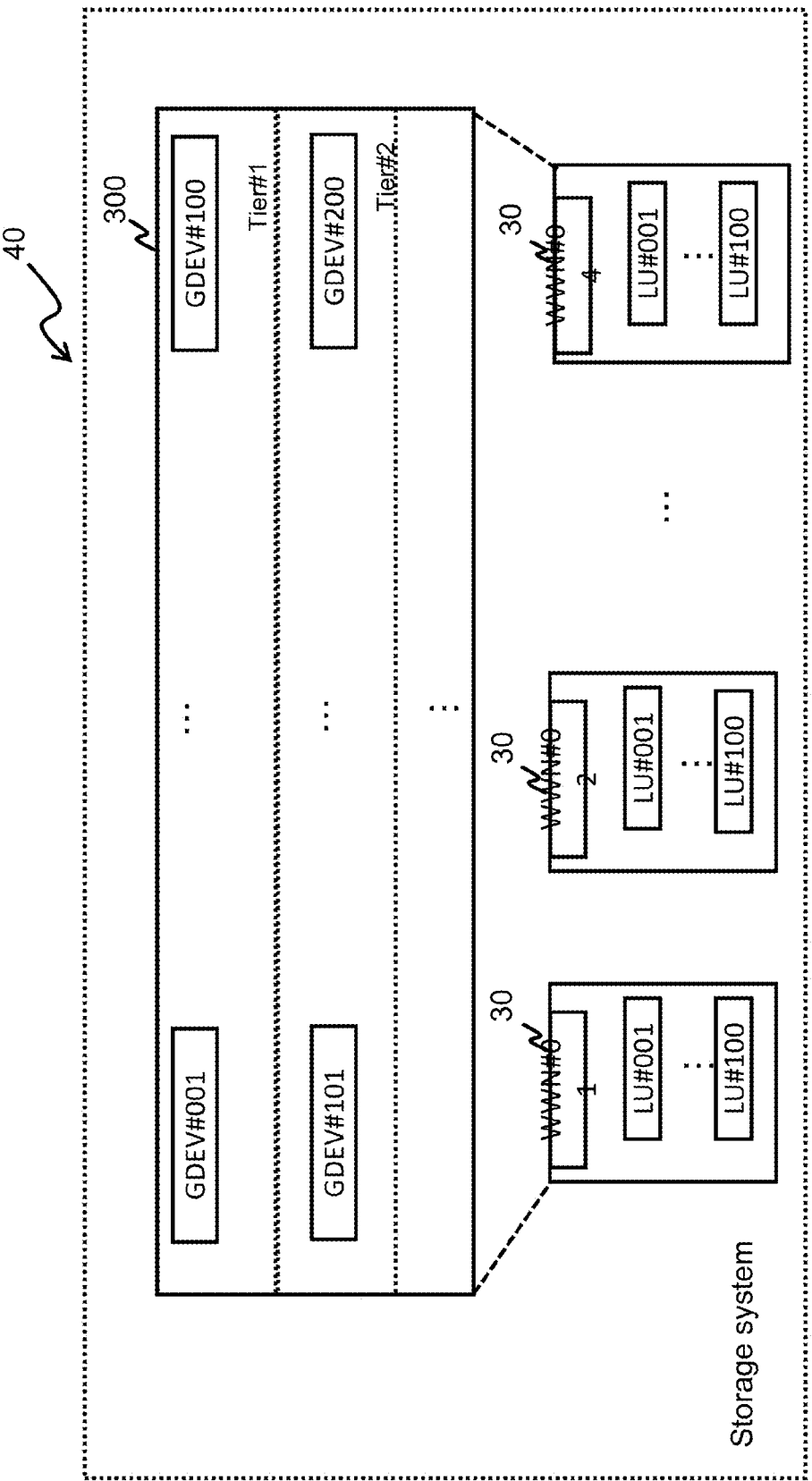
[FIG. 33]

FIG. 33 is a diagram for illustrating a storage cloud.

Each storage apparatus 30 comprises one or more physical storage devices 36 (refer to FIG. 2), and comprises either one or multiple LUs (Logical Units) configured based on a physical storage area of the physical storage device 36. A LUN (Logical Unit Number), which is uniquely identified inside each storage apparatus 30, is assigned to a LU.

A storage cloud 300, which is a virtual logical storage space, comprises multiple LUs. Specifically, the storage cloud 300 comprises multiple global devices (may be abbreviated as GDEV hereinbelow), which are virtual storage areas associated with the multiple LUs, respectively. The multiple LUs here may be the LUs of a single data management system 100 alone, or may be multiple LUs of multiple data management systems 100. A GDEV number, which is a unique identifier in the storage cloud 300, is assigned to a GDEV in the storage cloud 300. In this example, the GDEV number is associated with a LUN and a storage apparatus port number (WWN: World Wide Name). That is, the LUN and the WWN are information uniquely identifying the GDEV. A storage space of the storage cloud 300 is hierarchized in accordance with an attribute value of the GDEV (that is, the attribute value of the LU associated with the GDEV). The attribute value, for example, may be a performance or a bit cost of the LU associated with the GDEV. For example, management is performed such that a GDEV associated with a high-performance, high bit cost LU belongs to tier #1 (Tier #1), and a GDEV associated with a high-performance, medium bit cost LU belongs to tier #2 (Tier #2).

In the above-described data management system 100, data is migrated between GDEVs inside the storage cloud 300, that is, volume data stored in a LU associated with a GDEV, which is a migration source (a migration-source GDEV), is migrated to a LU associated with a GDEV, which is a migration destination (a migration-destination GDEV).

The migration of volume data between GDEVs, for example, is performed based on a retention rule inputted by a user. The retention rule is stored in the data management apparatus 50. The retention rule, for example, includes change-time identification information for identifying a point-in-time for changing a GDEV for storing volume data, and migration-destination unit definition information for defining a GDEV for migrating volume data. In addition, the retention rule may also include migration-source unit definition information for defining the GDEV in which the volume data is initially stored, that is, the migration-source GDEV. The retention rule, for example, comprises the performance and bit cost of the GDEV corresponding to the LU in which the volume data has been stored from the time the volume data was stored until the end of a prescribed time period (migration-source unit definition information), the performance and bit costs of the GDEV corresponding to the LU in which the volume data is to be stored after the prescribed time period has elapsed (migration-destination unit definition information), and the relevant prescribed time period. The change-time identification information for migrating the volume data is not limited to the period of time from the time that the volume data was stored, and, for example, may be a certain specified time. The following volume data migration processing is performed in accordance with a data management apparatus 50 instruction based on the retention rule. The volume data migration process comprises a data copy process, and an ES-SD update process.

<Data Copy Process>

The data copy process comprises an initial copy process and a SD-SD update process.

In an initial copy process, after a prescribed time period has elapsed, a storage apparatus (hereinafter referred to as the migration-source storage apparatus) 30, to which a LU (the migration-source LU) corresponding to a migration-source GDEV belongs, copies the volume data at this point-in-time in the migration-source LU of a storage apparatus (hereinafter referred to as the migration-destination storage apparatus) 30, to which a LU (the migration-destination LU) corresponding to a migration-destination GDEV belongs, to the migration-destination LU.

During the initial copy process, the migration-source storage apparatus 30 temporarily stores write data (refers to update data in the explanation here) slated for the migration-source LU in a storage device (for example, the cache memory 342) of the migration-source storage apparatus 30 together with write location information showing the write location in the LU.

After the initial copy process has ended, a SD-SD update process is executed. That is, in the SD-SD update process, the migration-source storage apparatus 30 sends the write location information and update data from the migration-source LU to the migration-destination LU. The migration-destination storage apparatus 30 updates the data of the migration-destination LU based on the received write location information and the update data.

During the SD-SD update process, the edge storage 20 suspends an IO command to the migration-source LU based on an IO request from the host 10. Specifically, the edge storage 20 stores the IO command (the write data and the write location information) to the migration-source LU based on the IO request from the host 10 in a storage device (for example, the cache memory 242) in the edge storage 20 without sending this IO command to the migration-source storage apparatus 30.

After the data copy process has ended, the edge storage 20 switches the coupling destination, which resulted from the IO request for the volume data from the host 10, from the migration-source GDEV to the migration-destination GDEV.

<ES-SD Update Process>

After the data copy process has ended, an ES-SD update process is executed. That is, the edge storage 20 sends write location information based on a write request with respect to the migration-source LU stored in itself to the migration-destination storage apparatus 30. Then, the migration-destination storage apparatus 30 updates the migration-destination LU data based on the received write location information and the update data.

In the process for migrating the volume data to the GDEV described hereinabove, the state is such that an IO request from the host 10 application, which will use the volume data stored in the GDEV, is capable of being received, and, in addition, it is not necessary for the host 10 application to be conscious of the GDEV in which the volume data is stored. Thus, a process for migrating volume data to a different GDEV can be performed while the host 10 application continues to run.

After migrating the volume data to a different GDEV, the edge storage 20 sends an IO request with respect to the volume data as an IO command from the host IO to the post-migration GDEV, and as such, there is no need to configure application software for supporting the volume data migration in the host 10, thus making it possible to perform a post-volume data migration path conversion without depending on the OS or application software of the host 10.

Next, Example 1 will be explained in detail.

FIG. 1 shows the configuration of a computer system related to Example 1.

The computer system comprises one or more data management systems 100. The data management system 100 comprises a host 10, an edge storage 20, a data management apparatus 50, a storage system 40 comprising multiple storage apparatuses 30, and communication networks CN1 and CN2. In a case where there are multiple data management systems 100, the data management systems 100 are coupled via a communication network CN3 as shown in the drawing.

The edge storage 20 is coupled to the host 10. The edge storage 20 is also coupled to multiple storage apparatuses 30 via the communication network CN1. The data management apparatus 50 is coupled to the respective hosts 10, the respective edge storages 20, and the respective storage apparatuses 30 in the data management system 100 via the communication network CN2.

The communication network CN1, for example, may be a communication network such as an IP-SAN (Internet Protocol-Storage Area Network) or a FC-SAN (Fibre Channel-SAN). Communication network CN2, for example, may be a communication network such as a LAN (Local Area Network) or the Internet. The communication network CN3, for example, may be a communication network such as a WAN (Wide Area Network) or the Internet.

Figure 2:
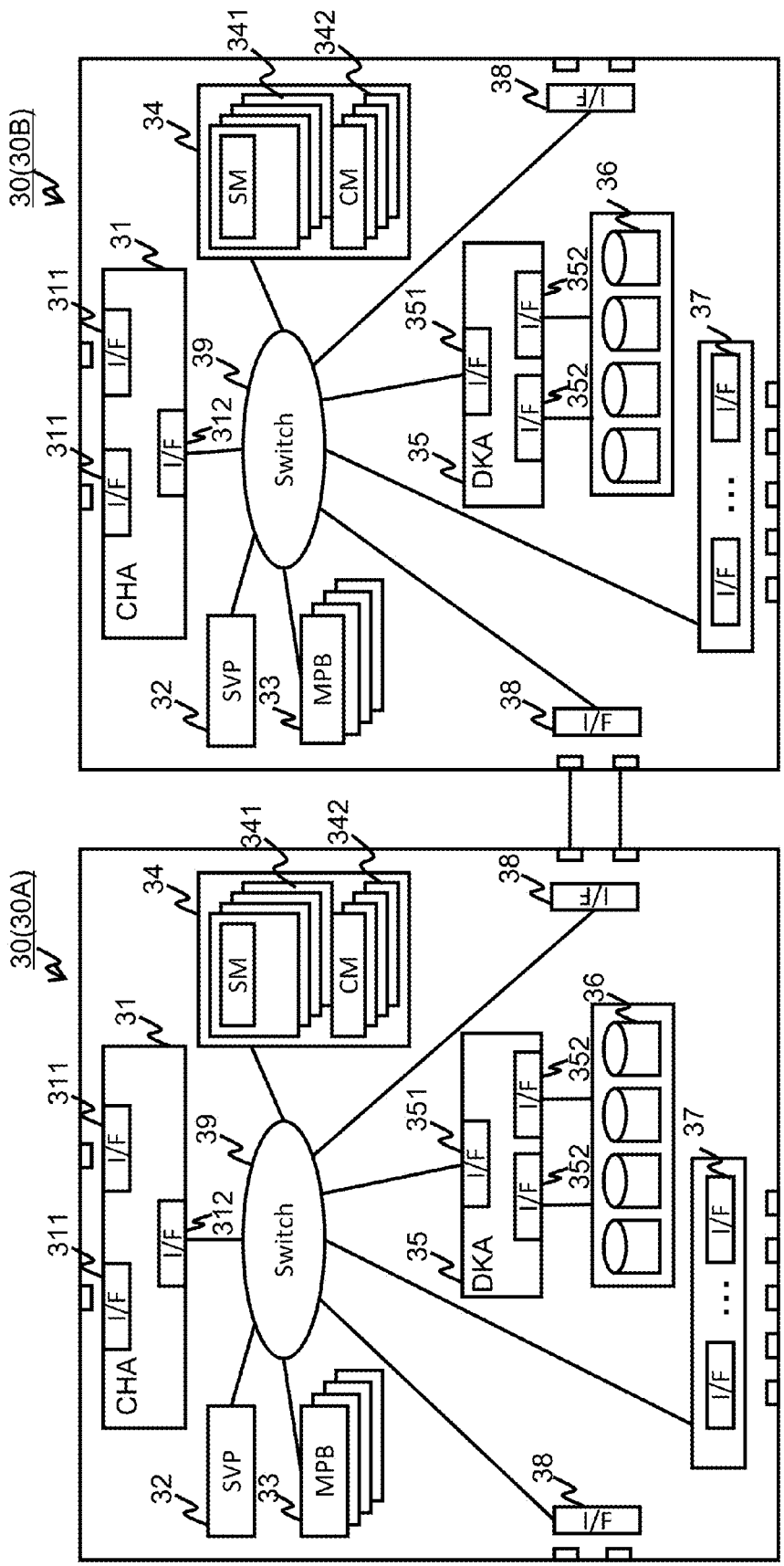
[FIG. 2]

The storage apparatus 30 comprises either one or multiple physical storage devices 36 (refer to FIG. 2). A RAID group may be configured using multiple physical storage devices 36 in the storage apparatus 30. The types of physical storage devices 36 include a SSD (Solid State Drive), a SAS (Serial Attached SCSI)-HDD (Hard Disk Drive), and SATA (Serial ATA)-HDD.

The storage apparatus 30 comprises either one or multiple logical units (LUs), which are logical storage spaces based on a physical storage area of one or more physical storage devices 36. The volume data stored in the LU is stored in a location corresponding to the physical storage area of the physical storage device 36. The LU may be a virtual LU based on a LU of a storage apparatus 30, which exists outside the storage system 40. For example, a LUN is associated with each LU as an identifier.

Each LU comprises various attributes. The attributes of each LU, for example, are based on the performance and bit cost of the physical storage device 36 constituting the basis of the LU, and the communication speed and so forth of the communication equipment related to the physical storage device 36. The performance of the physical storage device 36 depends on the type of physical storage device 36, and the RAID level and RAID group configuration (combination). In a case where the types of physical storage devices 36 are SSD, SAS-HDD, and SATA-HDD, the LU based on the SSD will feature higher performance that the LU based on the SAS-HDD and the SATA-HDD.

Multiple storage apparatuses 30 are coupled to one another, and multiple LUs based on these multiple storage apparatuses 30 are provided as a single virtual storage space. In this example, the virtual storage space is referred to as a storage cloud 300. The storage cloud 300 comprises multiple GDEVs. Each GDEV is associated with any of the multiple LUs having multiple attributes. The storage cloud 300 may be configured using only GDEVs associated with LUs (to include a virtual LU based on an external storage apparatus), which are based on multiple storage apparatuses 30 in a single storage system 40, or may be configured using GDEVs associated with LUs, which are based on multiple storage apparatuses 30 of multiple storage systems 40 spanning multiple data management systems 100 coupled via the communication network CN3. The storage cloud 300 is hierarchized in accordance with the attributes of the multiple GDEVs comprising this storage cloud 300.

The host 10 comprises a CPU and a storage resource (for example, a memory) not shown in the drawing. A computer program is stored in the storage resource. The CPU executes the computer program, which is in the storage resource. For example, a hypervisor may be stored in the storage resource. The hypervisor can build one or more virtual machines (virtual computers) in the host 10 in accordance with being executed by the CPU.

One edge storage 20 is coupled to one host 10. That is, a host 10 and an edge storage 20 form one pair. This pair of a host 10 and an edge storage 20 may be referred to as a host group. In this drawing, three host groups are shown, but the number of host groups is not limited thereto. There may be one host group, or there may be two or more host groups.

The data management apparatus 50 manages the data attribute, storage location, and retention method of the volume data stored in a LU associated with a GDEV of the storage cloud 300. The data management apparatus 50 also manages the bit cost and location of each storage apparatus 30 comprising a physical storage area, which constitutes the basis of a LU corresponding to each GDEV of the storage cloud 300. The data management apparatus 50 manages the location of the edge storage 20.

FIG. 2 shows the configuration of a portion of the storage system 40.

The storage system 40 comprises multiple storage apparatuses 30 (30A, 30B, and so forth). The components of each storage apparatus 30A and 30B are the same.

The storage apparatus 30, for example, can be broadly divided into a control part and a storage part. The storage part comprises multiple physical storage devices 36. The control part, for example, comprises a channel adapter (hereinafter abbreviated as CHA) 31, a service processor (hereinafter abbreviated as SVP) 32, one or more microprocessor blocks (hereinafter abbreviated as MPB), a memory part 34, a disk adapter (hereinafter abbreviated as DKA) 35, a storage I/F 38, and a data management apparatus I/F 37.

The CHA 31 comprises a communication I/F for carrying out communications with an edge storage 20 and with the respective parts inside the storage apparatus 30. Specifically, for example, the CHA 31 comprises one or more edge storage I/Fs 311 comprising multiple ports and one or more internal I/Fs 312 comprising multiple ports, which enable intercommunication. The edge storage I/F 311 is for communicating with the edge storage 20, and can communicate with the host 10 via the edge storage 20. The internal I/F 312 is coupled via a switch 39 to each part inside the storage apparatus 30 (in this case, the SVP 32, the MPB 33, the memory part 34, the DKA 35, the data management apparatus I/F 37, and the storage I/F 38). The CHA 31 may also be configured as a microcomputer system comprising a CPU, a memory, and so forth. A network address like the WWN (World Wide Name), for example, may be associated with each of the ports inside the edge storage I/F 311 and the internal I/F 312.

The DKA 35 comprises a communication I/F for communicating with each part inside the storage apparatus 30 (in this case, the CHA 31, the SVP 32, the MPB 33, the memory part 34, the data management apparatus I/F 37, and the storage I/F 38) and the physical storage device 36. Specifically, for example, the DKA 35 comprises one or more internal I/Fs 351, and one or more disk I/Fs 352. The DKA 35 may be configured as a microcomputer system comprising a CPU, a memory, and so forth. The DKA 35 translates the logical address of the LU (LBA: Logical Block Address) to a physical address in a case where data is being input/output to/from the physical storage device 36.

The memory part 34 comprises one or more shared memories (hereinafter abbreviated as SM) 341, and one or more cache memories (hereinafter abbreviated as CM) 342. The SM 341 stores various types of programs for controlling the storage apparatus 30. The SM 341 comprises a working area. The SM 341 also stores various types of tables, such as a retention LU management table 34101 (refer to FIG. 4).

The CM 342 stores data received from the edge storage 20. The CM 342 also stores data, which has been sent from the DKA 35.

The MPB 33 executes a process based on an IO request sent from the host 10 by way of the edge storage 20, and controls the transfer of data to and from the host 10. The MPB 33 also performs the process for migrating volume data between storage apparatuses 30 in accordance with an instruction from the data management apparatus 50, and controls the transfer of data between the storage apparatuses 30.

The storage I/F 38 is for coupling to another storage apparatus 30. Multiple storage apparatuses 30 can be coupled in series via the storage I/F 38. In this example, the storage cloud 300 is formed by multiple storage apparatuses 30 being coupled in series.

The data management apparatus I/F 37 is for carrying out communications with the data management apparatus 50. The data management apparatus I/F 37 may be configured as a microcomputer system comprising a CPU and a memory.

The SVP 32, for example, is a type of computer, and is used to either maintain or manage the storage apparatus 30. For example, the SVP 32 configures information related to the storage apparatus 30, and receives and displays information related to the storage apparatus 30.

Figure 3:
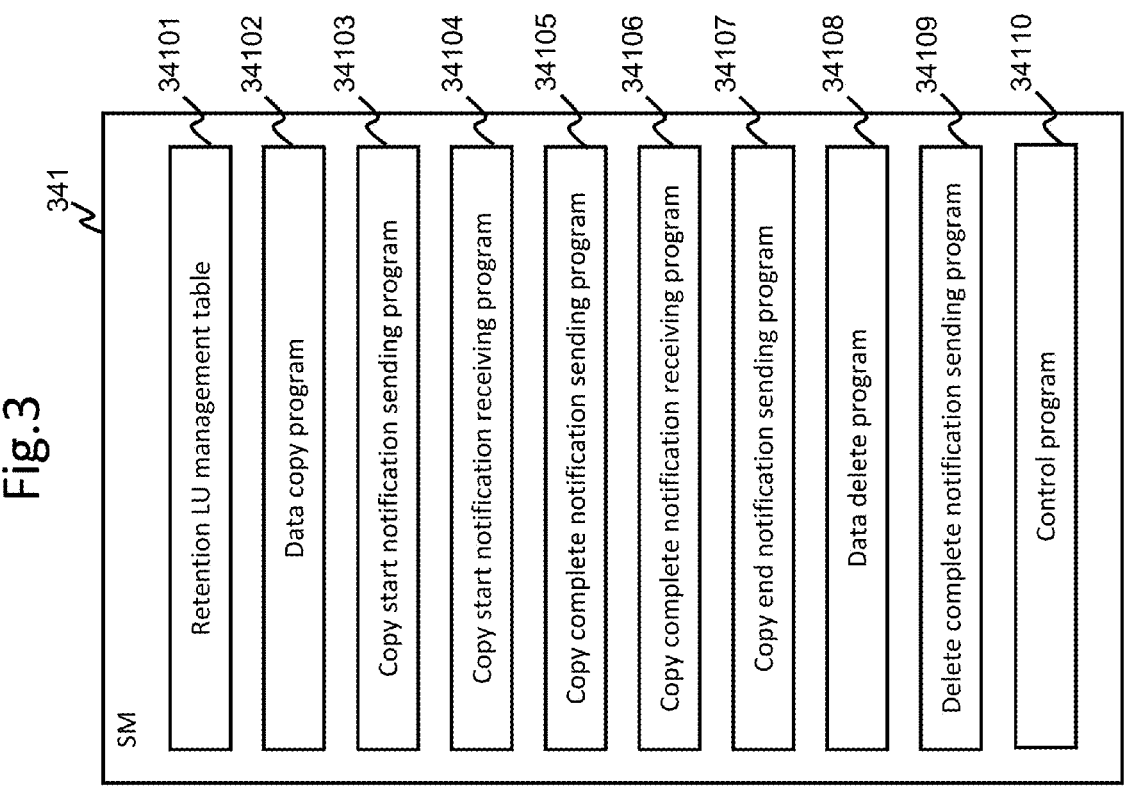
[FIG. 3]

FIG. 3 is a diagram showing the configuration of the SM 341.

The SM 341, for example, stores a retention LU management table 34101, data migration processing programs (34102 through 34109), and a control program 34110. The data migration processing programs comprise a data copy program 34102, a copy start notification sending program 34103, a copy start notification receiving program 34104, a copy complete notification sending program 34105, a copy complete notification receiving program 34106, a copy end notification sending program 34107, a data delete program 34108, and a delete complete notification sending program 34109.

The data copy program 34102 is for performing a process for copying data from a migration-source storage apparatus 30 to a migration-destination storage apparatus 30. The copy start notification sending program 34103 is for sending a notification to the migration-destination storage apparatus 30 to the effect that a data copy process is about to start. The copy start notification receiving program 34104 is for receiving a notification from the migration-source storage apparatus 30 to the effect that a data copy process is about to start. The copy complete notification sending program 34105 is for sending a notification to the migration-source storage apparatus 30 to the effect that the data copy process has been completed. The copy complete notification receiving program 34106 is for receiving a notification from the migration-destination storage apparatus 30 to the effect that the data copy process has been completed. The copy end notification sending program 34107 is for sending a notification to the data management apparatus 50 to the effect that the data copy process has ended. The data delete program 34108 is for performing a data delete process with respect to data for which a copy to the migration-destination storage apparatus 30 has been completed. The delete complete notification sending program 34109 is for sending a notification to the data management apparatus 50 to the effect that the data delete process has ended.

The control program. 34110 is for performing an internal process in its own storage apparatus 30, and for sending and receiving data or a command to/from another apparatus.

FIG. 4 is a diagram showing the retention LU management table 34101.

The retention LU management table 34101 stores LU information in its own storage apparatus 30. Specifically, for example, the retention LU management table 34101 comprises the following information for each LU.

A WWN # 401, which is the identifier of its own port, which is coupled to a LU.

A LUN # 402, which is the identifier of the LU.

The respective information of the retention LU management table 34101 is notified to the data management apparatus 50. For example, in accordance with executing the control program 34110, the MPB 33 may notify the data management apparatus 50 and/or the edge storage 20 of the respective information when the storage apparatus 30 has been coupled to the communication network CN1, or may notify the data management apparatus 50 and/or the edge storage 20 of the respective information on a regular basis. The MPB 33 may also issue a notification concerning the respective information as a response to a query from the data management apparatus 50 and/or the edge storage 20.

Figure 5:
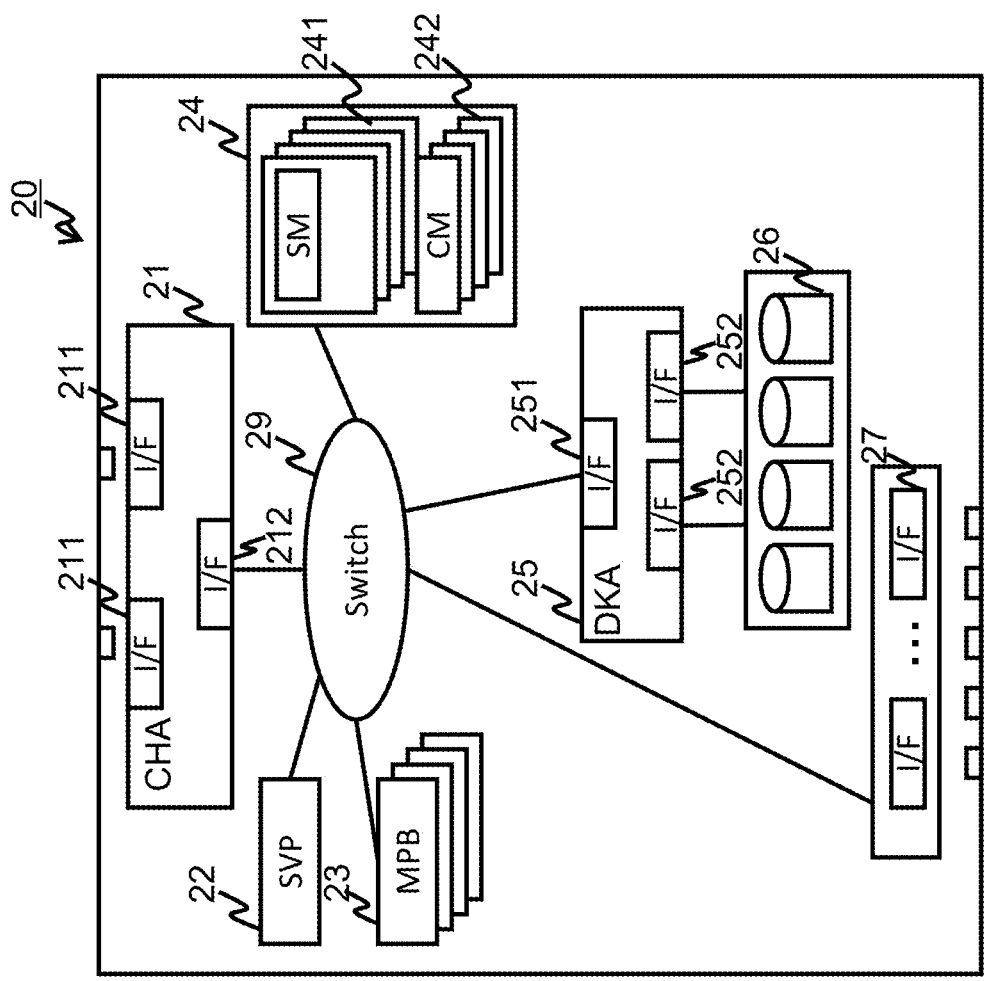
[FIG. 5]

FIG. 5 is a diagram showing the configuration of the edge storage 20.

The edge storage 20 is coupled to each host 10 on a one-to-one basis. In this example, the edge storage 20 is not directly coupled to another host 10 or another edge storage apparatus 20. The edge storage 20 basically constitutes the same configuration as the storage apparatus 30 with the exception of not comprising an I/F corresponding to the storage I/F 38 shown in FIG. 2 for coupling to another apparatus (for example, another edge storage 20). The edge storage 20, for example, can be broadly divided into a control part and a storage part. The storage part comprises multiple physical storage devices 26. The capacity of a physical storage device 26 may be smaller than the capacity of the physical storage device 36 of the storage apparatus 30. The control part, for example, comprises a CHA 21, a SVP 22, one or more MPBs 23, a memory part 24, a DKA 25, and a storage I/F 27.

The CHA 21 comprises a communication I/F for carrying out communications with the host 10 and between the various parts inside the edge storage 20. Specifically, for example, the CHA 21 comprises one or more host storage I/Fs 211 comprising multiple ports and one or more internal I/Fs 212 comprising multiple ports, which enable intercommunication. The host storage I/F 211 is for communicating with the host 10. The internal I/F 212 is coupled via a switch 29 to each part inside the edge storage 20 (in this case, the SVP 22, the MPB 23, the memory part 24, the DKA 25, and the storage I/F 27). The CHA 21 may also be configured as a microcomputer system comprising a CPU, a memory, and so forth. A network address like the WWN, for example, is associated with the ports of the host storage I/F 211 and the internal I/F 212.

The DKA 25 comprises a communication I/F for communicating with each part inside the edge storage 20 (in this case, the CHA 21, the SVP 22, the MPB 23, the memory part 24, and the storage I/F 27) and the physical storage device 26. Specifically, for example, the DKA 25 comprises one or more internal I/Fs 251, and one or more disk I/Fs 252. The DKA 25 may be configured as a microcomputer system comprising a CPU, a memory, and so forth. The DKA 25 translates the logical address of the LU (LBA: Logical Block Address) to a physical address in a case where data is being input/output to/from the physical storage device 26.

The memory part 24 is an example of a storage resource, and comprises one or more SMs 241, and one or more CMs 242. The SM 241 stores various types of programs for controlling the edge storage 20. The SM 241 also comprises a working area. In addition, the SM 241 stores various types of tables, which will be explained further below.

The CM 242 stores data received from the host 10. The CM 242 also stores data, which has been sent from the DKA 25.

The MPB 23 is an example of a control resource, executes a process based on an IO request sent from the host 10, and controls the transfer of data to/from the host 10. The MPB 23 also controls the transfer of data between the storage apparatuses 30 in accordance with an instruction from the data management apparatus 50.

The storage I/F 27 is for carrying out communications with a storage apparatus 30. The storage I/F 27 may be configured as a microcomputer system comprising a CPU, a memory, and so forth.

The SVP 22, for example, is a type of computer, and is used to either maintain or manage the edge storage 20.

Figure 6:
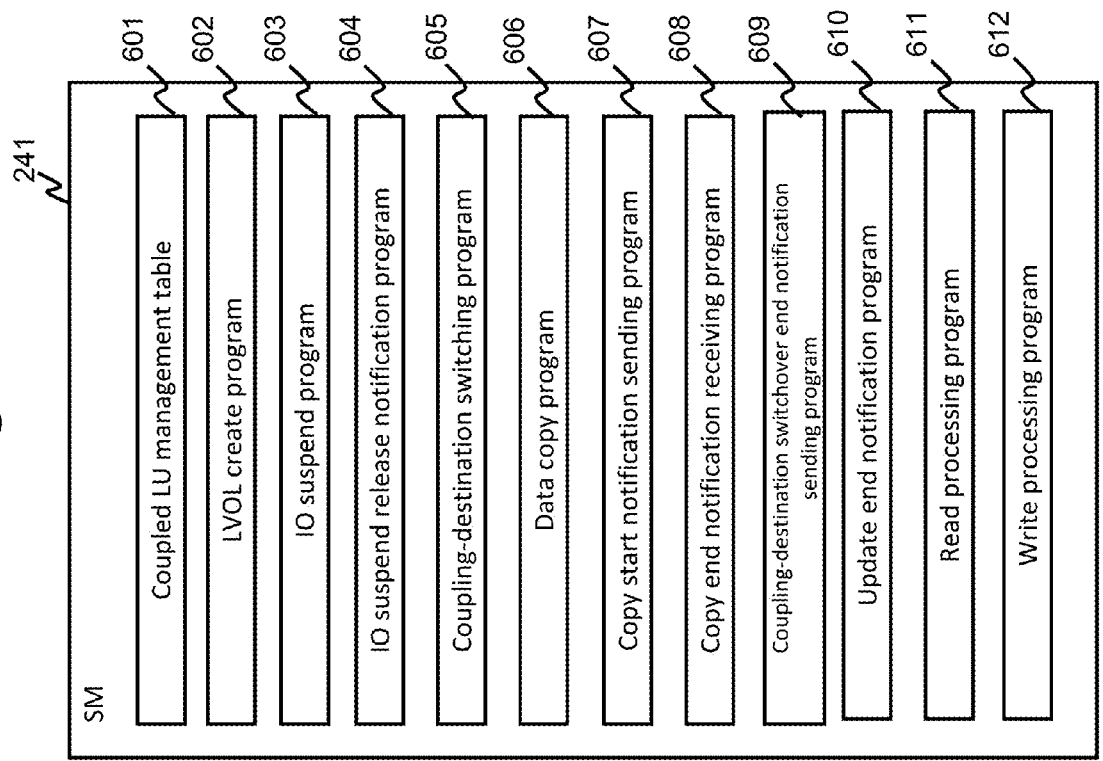
[FIG. 6]

FIG. 6 is a diagram showing the configuration of the SM 241.

The SM 241 stores a coupled LU management table 601, a LVOL create program 602, an IO suspend program 603, an IO suspend release notification program 604, a coupling-destination switching program 605, a data copy program 606, a copy start notification sending program 607, a copy end notification receiving program 608, a coupling-destination switchover end notification sending program 609, an update end notification program 610, a read processing program 611, and a write processing program 612.

The LVOL create program 602 is for creating a virtual logical volume (hereinafter LVOL), which is provided to the host 10. The IO suspend program 603 is for executing a process for suspending an IO process with respect to the storage apparatus 30 in a case where the edge storage 20 has received an IO request (either a read request or a write request) from the host 10. Specifically, the IO suspend program 603 suspends sending an IO request-based IO command to the storage apparatus 30. The IO suspend program 603 also stores an IO request (in the case of a write request, also includes the write data thereof) during the suspension of the IO process in the CM 242. The IO suspend release notification program 604 is for notifying the data management apparatus 50 that the IO process suspend has been released. The coupling-destination switching program 605 is for switching a coupling destination, which is based on an IO request with respect to migration-targeted volume data, from the migration-source storage apparatus 30 to the migration-destination storage apparatus 30. The data copy program 606 is for writing the write data stored in the CM 242 during the IO process suspend of the IO suspend program 603 to the migration-destination storage apparatus 30. The copy start notification sending program 607 is for notifying the migration-destination storage apparatus 30 of the start of a write-data write. The copy end notification receiving program 608 is for receiving a notification from the migration-destination storage apparatus 30 to the effect that the write-data write has ended. The read processing program 611 is for reading read data from a targeted LU in accordance with a normal read process, that is, a read request from the host 10. The write processing program 612 is for writing write-data to a targeted LU in accordance with a normal write process, that is, a write request from the host 10.

FIG. 7 is a diagram showing the coupled LU management table 601.

The coupled LU management table 601 is for storing information of a LU managed by its own edge storage 20. In other words, the coupled LU management table 601 is for storing the information of a LU, which is coupled to its own edge storage 20. Specifically, for example, the coupled LU management table 601 comprises the following information for each LU.

A LVOL # 701 (an example of first identification information), which is the identifier of the LVOL corresponding to a LU.

A WWN # 702, which is the identifier of the port of the storage apparatus 30 to which the LU is coupled.

A LUN # 703, which is the identifier of the LU. A combination of the WWN # 702 and the LUN # 703 corresponds to second identification information.

An edge storage ID (that is, the ID of its own edge storage) 704, which is the identifier of the edge storage 20 to which the LU is coupled.

Figure 8:
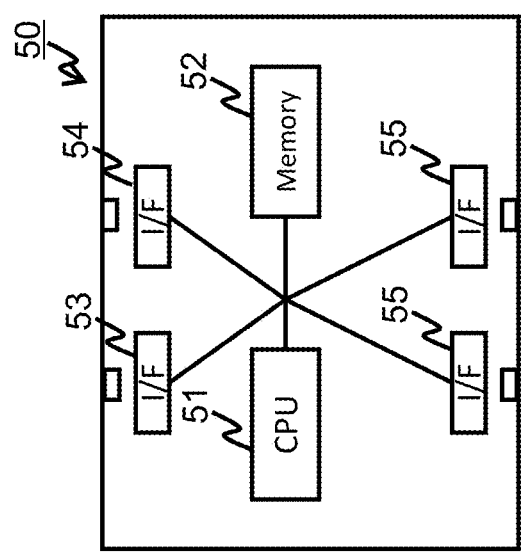
[FIG. 8]

FIG. 8 is a diagram showing the configuration of the data management apparatus 50.

The data management apparatus 50, for example, comprises a CPU 51 as an example of a control device, a memory 52 as an example of a storage resource, a host I/F 53, an edge storage I/F 54, and a storage I/F 55.

The memory 52 stores various types of programs, which will be explained further below, and various types of tables, which will be explained further below, for managing the data management system 100.

The CPU 51 executes the various types of programs stored in the memory 52, and performs data management for the data management system 100.

The host I/F 53 is for carrying out communications with the host 10. The edge storage I/F 54 is for carrying out communications with the edge storage 20. The host I/F 53 and the edge storage I/F 54 may be configured as microcomputer systems comprising a CPU, a memory, and so forth.

The storage I/F 55 is for carrying out communications with the storage apparatus 30. The storage I/F 55 may be configured as microcomputer systems comprising a CPU, a memory, and so forth. The storage I/F 55 may be provided in proportion to the number of storage apparatuses 30 so as to be coupled to all of the storage apparatuses 30 in the data management system 100, or may be provided in proportion to a number of either one, or two or more so as to be coupled to either one, or two or more storage apparatuses 30.

Figure 9:
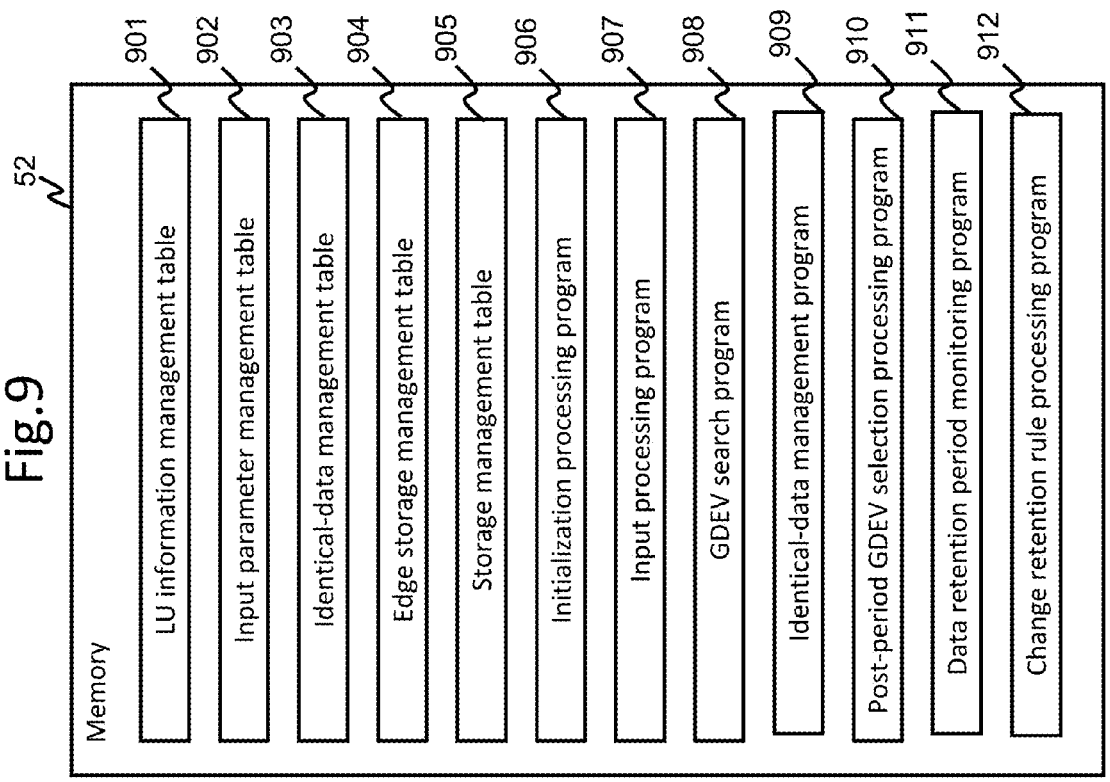
[FIG. 9]

FIG. 9 is a diagram showing the configuration of the memory 52.

The memory 52 stores a LU information management table 901, an input parameter management table 902, an identical-data management table 903, an edge storage management table 904, a storage management table 905, an initialization processing program 906, an input processing program 907, a GDEV search program 908, an identical-data management program 909, a post-period GDEV selection processing program 910, a data retention period monitoring program 911, and a change retention rule processing program 912. Each of the tables and programs will be explained in detail below.

FIG. 10 is a diagram showing the LU information management table 901.

The LU information management table 901 is for managing information of a LU associated with a GDEV of the storage cloud 300. Specifically, for example, the LU information management table 901 comprises the following information for each GDEV, which is a virtual logical storage area, which corresponds to the address of a port coupled to a LUN and a LU and is uniquely identified inside the storage cloud 300.

A WWN # 1001, which is the identifier of a port coupled to a LU.
A LUN # 1002, which is the LU identifier.
A GDEV # 1003, which is the identifier of a GDEV corresponding to a combination of a WWN # and a LU #.
A performance 1004, which shows the performance of the GDEV.
A bit cost 1005, which shows the bit cost of the GDEV.
A data (yes/no) 1006, which shows whether or not volume data is stored in the GDEV.

The GDEV performance and bit cost here correspond to the performances and bit costs of the LU and port corresponding to the GDEV. Also, the volume data stored in the GDEV refers to the volume data stored in the LU corresponding to the GDEV. The performance 1004 and the bit cost 1005 of the LU information management table 901 may be configured in accordance with the user inputting this information from the host 10 (or an input/output apparatus coupled to the data management apparatus 50). The performance 1004 and the bit cost 1005 may also be configured by either the storage apparatus 30 or the data management apparatus 50, for example, measuring performance based on the IOPS and response time of each GDEV, and, in addition, determining the bit cost in accordance with the type of disk on which each LU is based.

Furthermore, a WWN and a LUN notified from the storage apparatus 30 are stored in the WWN # 1001 and the LUN # 1002 A GDEV identifier created by the initialization processing program 906 (refer to FIG. 9) is stored in the GDEV # 1003.

FIG. 11 is a diagram showing the input parameter management table 902.

The input parameter management table 902 is for managing a retention rule for volume data used by the host 10. The retention rule of the input parameter management table 902, for example, is configured based on information inputted by the user from the host 10. Specifically, for example, the input parameter management table 902 comprises the following information for each volume data-storing GDEV.

A WWN # 1101, which is the identifier of a port coupled to a LU.
A LUN # 1102, which is the LU identifier.
A data name 1103, which shows the identifier (a user-inputted name) of volume data stored in a GDEV.
A time period 1104, which shows the remaining period of time until the retention rule for a volume data-storing GDEV changes.
A within-period performance 1105 of the GDEV, which is to store the volume data.
A within-period bit cost 1106 of the GDEV, which is to store the volume data.
A within-period protection level 1107 showing whether or not the volume data is stored using n-duplication (where n≥1).
A post-period performance 1108 of the GDEV, which is to store the volume data.
A post-period bit cost 1109 of the GDEV, which is to store the volume data.
A post-period protection level 1110 showing whether or not the volume data is stored using n-duplication (where n≥1).

According to the volume data entry (row) for which the data name 1103 in the input parameter management table 902 is "BBB", the volume data "BBB" is stored as follows.

During the time period (within twenty days from the present), the volume data is stored in the GDEV corresponding to WWN 2 and LUN 2, which have high performances and high bit costs, and is managed in duplicate.

After the time period, the volume data is stored in a GDEV having low performance and a low bit cost, and is managed singly.

FIG. 12 is a diagram showing the identical-data management table 903.

The identical-data management table 903 is for managing multiplexed volume data in a case where the volume data has been multiplexed. Specifically, for example, the identical-data management table 903 comprises the following information for each GDEV based on the volume data retention rule.

A WWN # 1201, which is the identifier of a port coupled to a LU.
A LUN # 1202, which is the LU identifier.
A GDEV # 1203, which is the identifier of a GDEV corresponding to the LU shown by a WWN # and a LU #.
An identical-data management ID 1204, which is the identifier showing GDEVs in which identical volume data are being stored.

Furthermore, the same identical-data management ID is stored in entries corresponding to multiple GDEVs in which identical volume data is being stored in accordance with multiplexing. For example, according to the drawing, it is clear that identical volume data are being stored in duplicate in GDEV "110" and GDEV "111", which comprise identical-data management ID "10".

FIG. 13 is a diagram showing the edge storage management table 904.

The edge storage management table 904 is for storing management information for an edge storage 20 to which a GDEV is coupled. The edge storage management table 904, specifically, for example, comprises the following information for each GDEV.

A WWN # 1301, which is the identifier of a port coupled to a LU corresponding to a GDEV.
A LUN # 1302, which is the identifier of the LU corresponding to the GDEV.
An edge storage ID 1303, which shows the identification number of the edge storage 20 to which the GDEV indicated by the WWN # 1301 and the LUN # 1302 is allocated.

FIG. 14 is a diagram showing the storage management table 905.

The storage management table 905 is for storing management information for a storage apparatus 30 constituting the basis of a LU, which is associated with a GDEV. The storage management table 905, specifically, for example, comprises the following information for each GDEV.

A WWN # 1401, which is the identifier of a port coupled to a LU corresponding to a GDEV.

A LUN # 1402, which is the identifier of the LU corresponding to the GDEV.

A storage ID 1403, which shows the identification number of the storage apparatus 30 constituting the LU, which is associated with the GDEV indicated by the WWN # 1401 and the LUN # 1402.

Next, processing in the computer system related to Example 1 will be explained.

Figure 15:
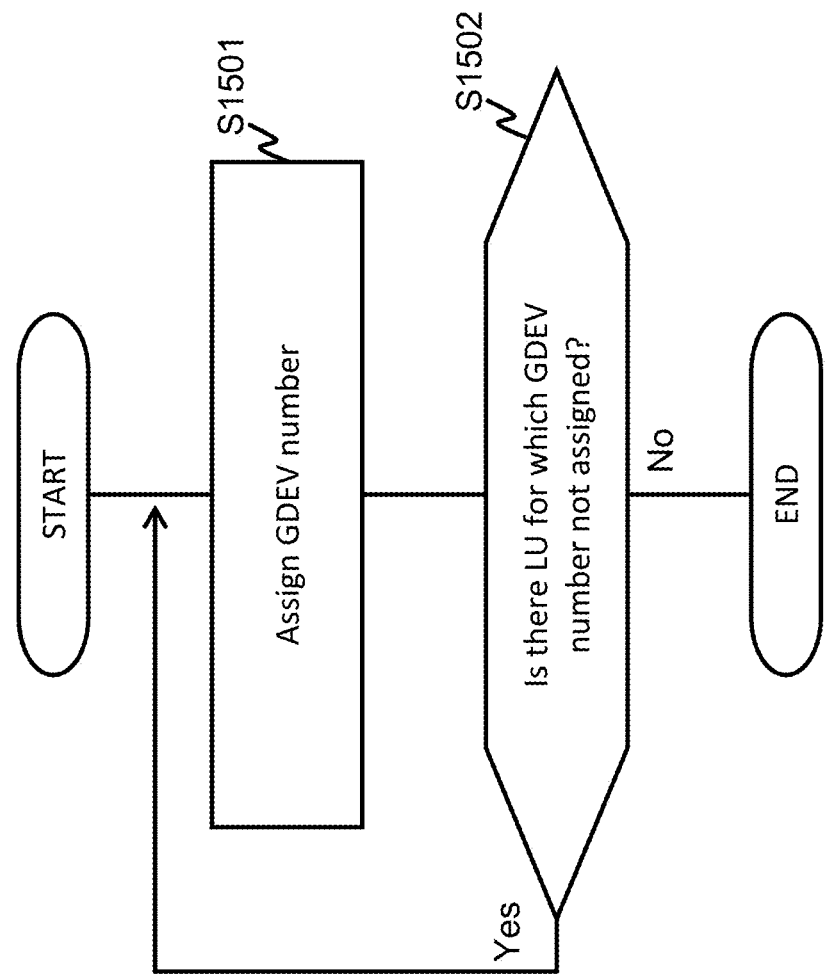
[FIG. 15]

FIG. 15 is a flowchart of initialization processing.

The initialization process is performed in accordance with the CPU 51 executing the initialization processing program 906, which is stored in the memory 52 of the data management apparatus 50. The initialization process may be performed on a regular basis, or may be performed in accordance with a user instruction from the host 10. Hereinbelow, the user instruction will be explained as being performed from the host 10, but the user instruction may also be performed using an input/output apparatus (for example, a PC) coupled to the data management apparatus 50.

The initialization process is for creating a GDEV in the storage cloud 300. The data management apparatus 50 assigns a GDEV number, which is uniquely identified in the storage cloud 300, to a LU of the storage system 40, and stores the GDEV number in the LU information management table 901. Specifically, for example, the following processing is performed. Furthermore, it is supposed that, prior to the initialization process, a WWN and LUN for a LU comprising the storage cloud 300 have been identified, and values have been configured in the WWN # 1001 and the LUN # 1002 of the LU information management table 901.

In Step S1501, the data management apparatus 50 references the LU information management table 901, identifies a combination of a WWN and a LUN to which a GDEV number has not been assigned, assigns a GDEV number capable of being uniquely identified by the storage cloud 300 to the LU corresponding to the relevant WWN and LUN combination, and stores the GDEV number in the GDEV # 1003 of the LU information management table 901. In accordance with this, the LU indicated by the WWN and LUN combination is associated with the GDEV and managed.

In Step S1502, the data management apparatus 50 references the LU information management table 901, and determines whether or not there exists a combination of a WWN and LUN with which a GDEV number has not been associated. In a case where the result of the determination is that there is a combination with which a GDEV number has not been associated (Step S1502: Yes), the data management apparatus 50 moves the processing to Step S1501. Alternatively, in a case where the result of the determination is that there is no combination with which a GDEV number has not been associated, that is, a GDEV number has been associated with all the combinations (Step S502: NO), the data management apparatus 50 ends the processing.

According to the initialization process described above, it is possible to create a GDEV corresponding to a LU, which is identified using the path to the LU (the port number in the storage apparatus 30 coupled to the LU) and the LUN for the port.

Figure 16:
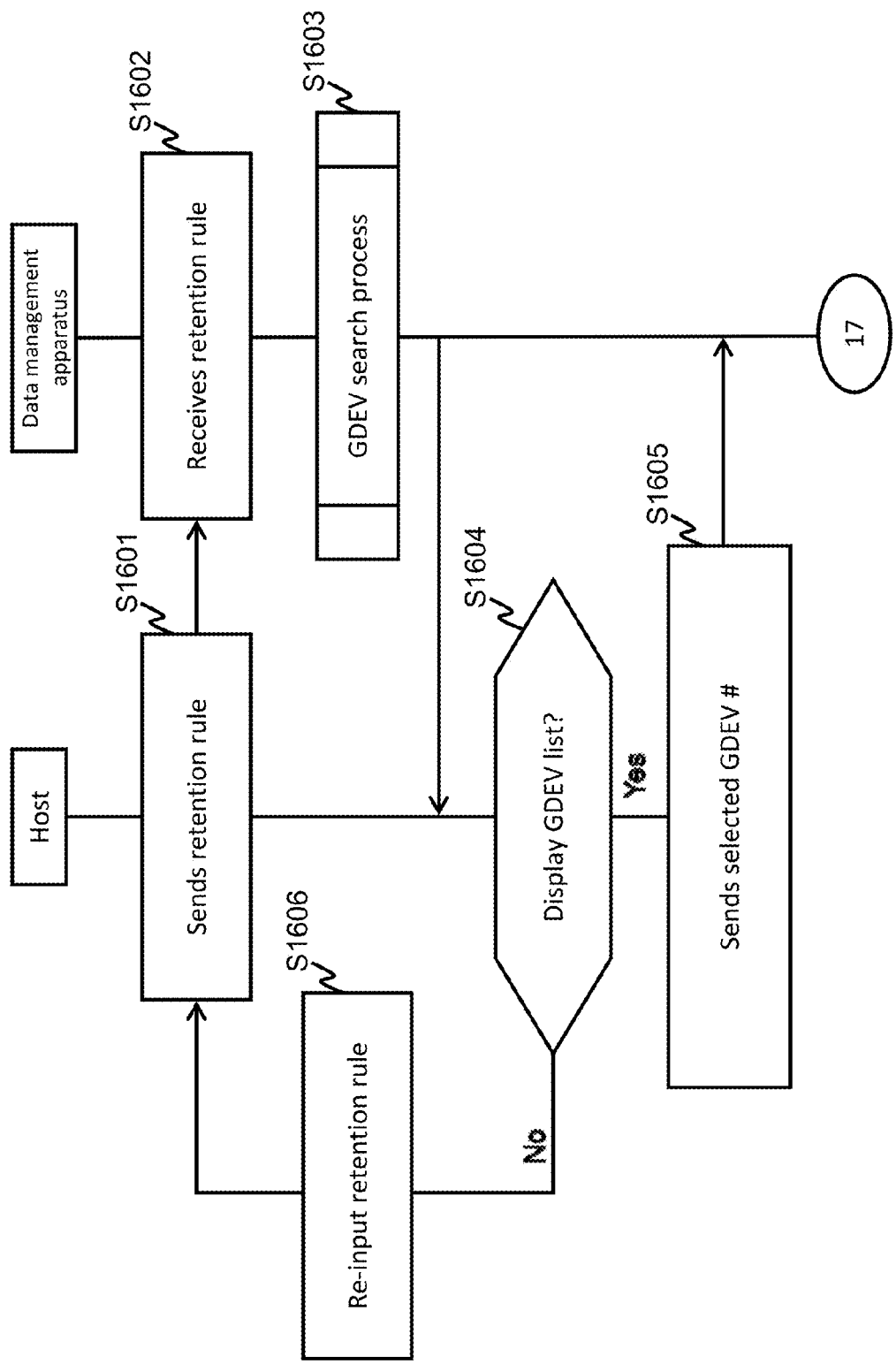
[FIG. 16]
Figure 17:
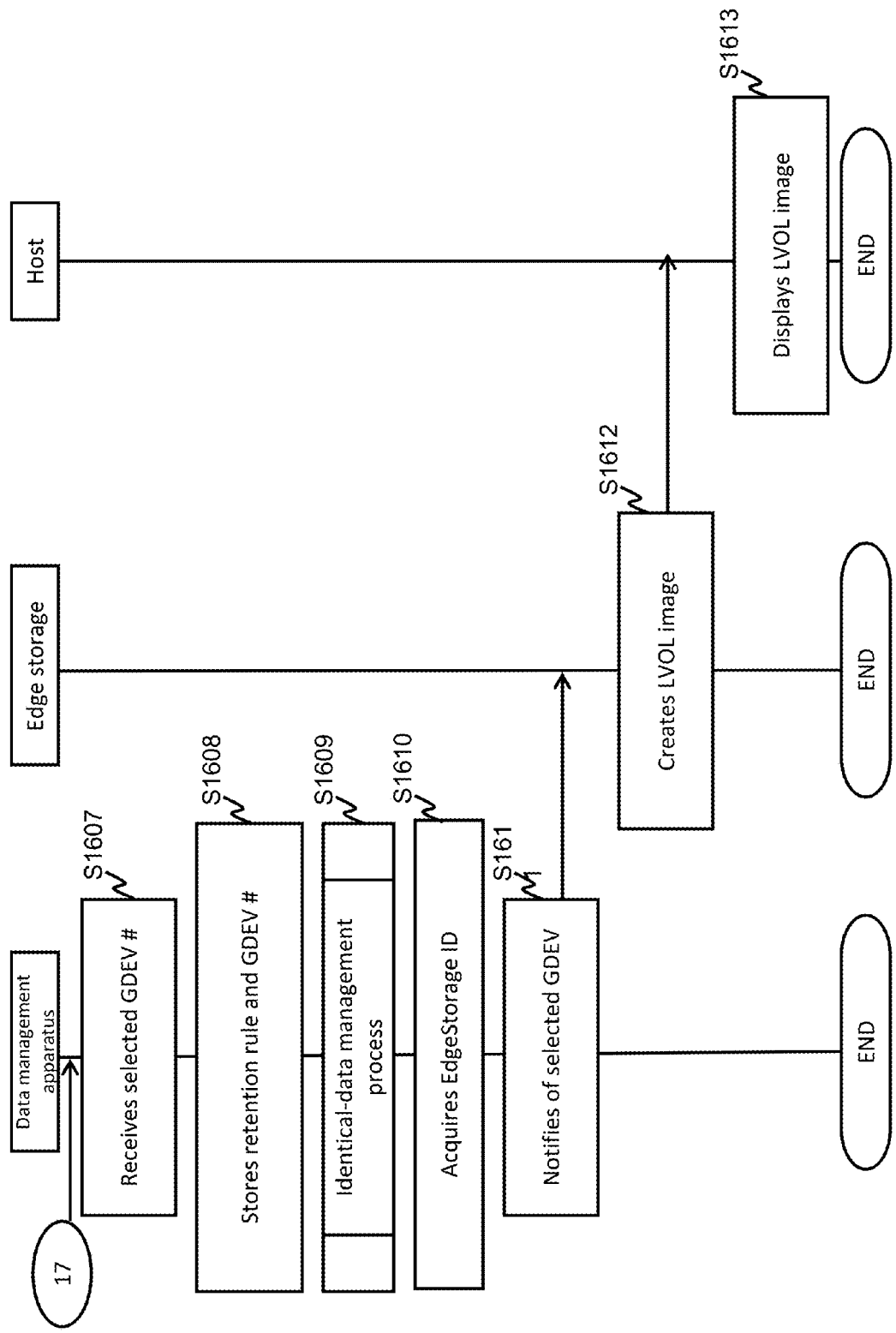
[FIG. 17]

FIG. 16 is a first flowchart of input processing. FIG. 17 is a second flowchart of input processing. Furthermore, the oval parts having the same reference sign in the flowcharts of FIGS. 16 and 17 indicate that the flowcharts are interlinked.

The processing in accordance with a data management apparatus 50 input process is performed in accordance with the CPU 51 executing the input processing program 907 stored in the memory 52 of the data management apparatus 50. The input process may be started in accordance with a user instruction from the host 10 (or an input/output apparatus coupled to the data management apparatus 50).

The input process is for selecting a GDEV to store the volume data. The data management apparatus 50 acquires the GDEV number of the GDEV, which conforms to the retention rule for the volume data sent from the host 10, and sends the acquired GDEV number to the host 10. Specifically, for example, the following processing is performed.

In Step S1601, the host 10 displays a retention rule input screen 270 (refer to FIG. 27), which will be explained further below. Then, the host 10 sends a retention rule inputted by the user to the data management apparatus 50 as the retention rule.

In Step S1602, the data management apparatus 50 receives the retention rule data.

In Step S1603, the data management apparatus 50 performs a GDEV search process (refer to FIG. 18), which will be explained further below. Then, the data management apparatus 50 sends an instruction obtained in accordance with the GDEV search process to the host 10.

In Step S1604, the host 10 receives the instruction of Step S1603, and determines whether or not this instruction is an instruction to display a GDEV list. In a case where the result of the determination is that the instruction of Step S1603 is a GDEV list display instruction (Step S1604: Yes), the host 10 displays the GDEV list display screen (for example, the GDEV list display screen 280 of FIG. 28), and advances the processing to Step S1605. Alternatively, in a case where the result of the determination is that the instruction of Step S1603 is not a GDEV list display (Step S1604: No), the host 10 displays a screen other than the GDEV list display screen (for example, the error screen 290 of FIG. 29), and advances the processing to Step S1606.

In Step S1606, the host 10 displays a screen urging the re-input of the retention rule (for example, the retention rule input screen 270 of FIG. 27), and moves the processing to Step S1601.

In Step S1605, the host 10 sends either one or multiple GDEV numbers, which the user has selected from the GDEV list of the GDEV list display screen 280, to the data management apparatus 50. Subsequent processing will be explained further below by referring to FIG. 17.

The various screens displayed on the host 10 (or an input/output apparatus coupled to the data management apparatus 50) will be explained here.

Figure 27:
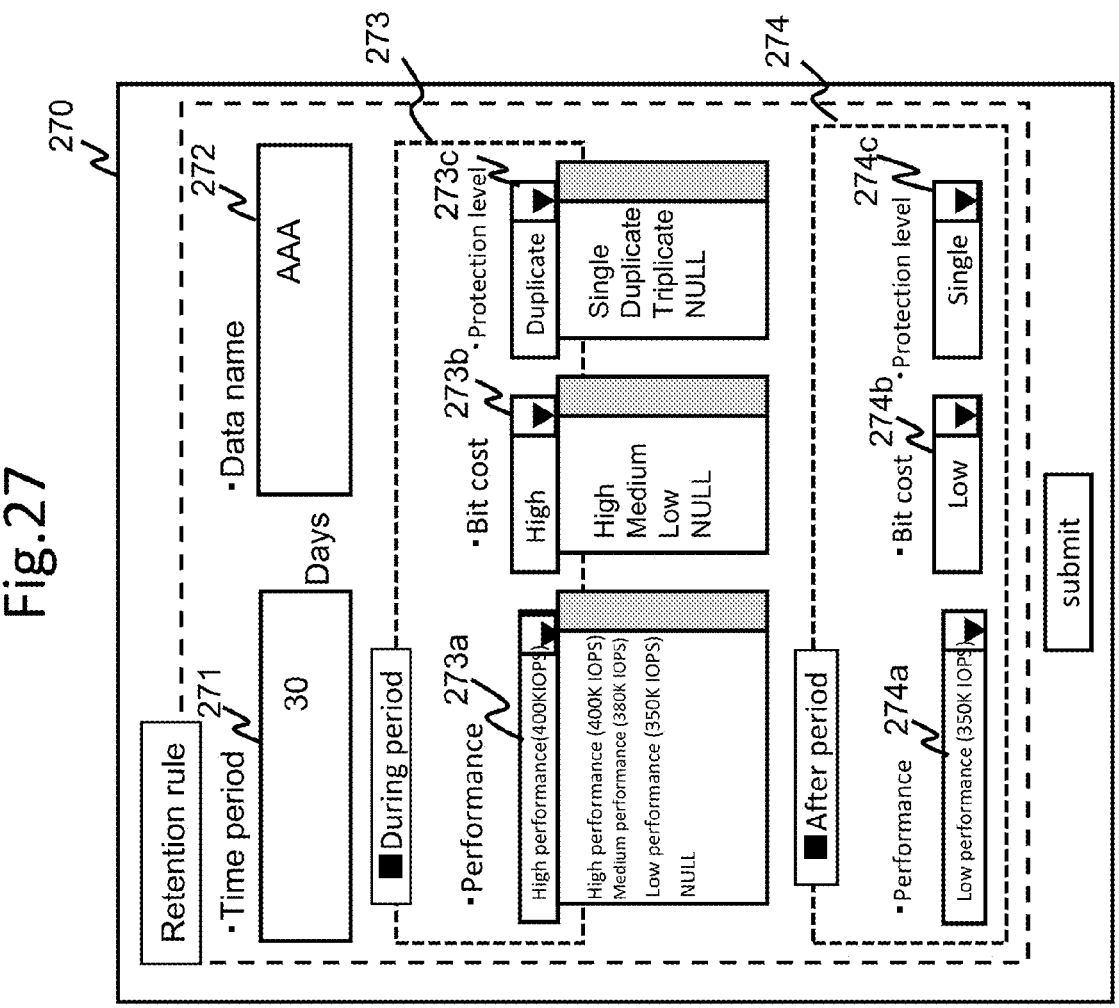
[FIG. 27]

FIG. 27 shows an example of the retention rule input screen.

The retention rule input screen 270, for example, is displayed on the host 10 (or an input/output apparatus coupled to the data management apparatus 50) in Step S1601 of the input processing shown in FIG. 16. A user can easily input a retention rule using this retention rule input screen 270. As retention rule input fields, the retention rule input screen 270 comprises a time period input field 271, a data name input field 272, a within-period GDEV attribute input field 273, and a post-period GDEV attribute input field 274.

A time period up to when an attribute of the GDEV, which stores the volume data, changes (a time period from a prescribed point in time) is inputted in the time period input field 271. That is, a time period during which a GDEV attribute configured as the within-period GDEV attribute in the retention rule input screen 270 is inputted in the time period input field 271. A name (a data name) for identifying stored volume data is input to the data name input field 272. The data name may be arbitrarily decided by the user.

A GDEV attribute specifying the GDEV, which should store the volume data until the end of the time period configured in the time period input field 271, is inputted to the within-period GDEV attribute input field 273. The GDEV attribute is decided based on the attribute of the LU associated with the GDEV and the path to the LU (the port number in the storage apparatus 30 coupled to the LU). In the example shown in FIG. 27, the within-period GDEV attribute input field 273 comprises a performance input field 273*a*, a bit cost input field 273*b*, and a protection level input field 273*c*. A performance specifying the GDEV, which should store the volume data during the time period, is inputted to the performance input field 273*a*. A bit cost specifying the GDEV, which should store the volume data during the time period, is inputted to the bit cost input field 273*b*. A protection level (the n-duplication of the volume data (where n≥1)) for the GDEV, which should store the volume data during the time period, is inputted to the protection level input field 273*c*.

A GDEV attribute specifying the GDEV, which should store the volume data after the time period configured in the time period input field 271 has elapsed, is inputted to the post-period GDEV attribute input field 274. In the example shown in FIG. 27, the post-period GDEV attribute input field 274 comprises a performance input field 274*a*, a bit cost input field 274*b*, and a protection level input field 274*c*. A GDEV performance specifying the GDEV, which should store the volume data subsequent to the passage of the time period, is inputted to the performance input field 274*a*. A GDEV bit cost specifying the GDEV, which should store the volume data subsequent to the passage of the time period, is inputted to the bit cost input field 274*b*. A protection level for the GDEV, which should store the volume data subsequent to the passage of the time period, is inputted to the protection level input field 274*c*.

The retention rule input screen 270 shown in FIG. 27 shows an input example in a case where volume data "AAA" is stored in duplicate in a high-performance, high-bit-cost GDEV for thirty days from a prescribed point-in-time, and, in addition, is stored singly in a low-performance, low-bit-cost GDEV subsequent to the passage of the thirty days.

Figure 28:
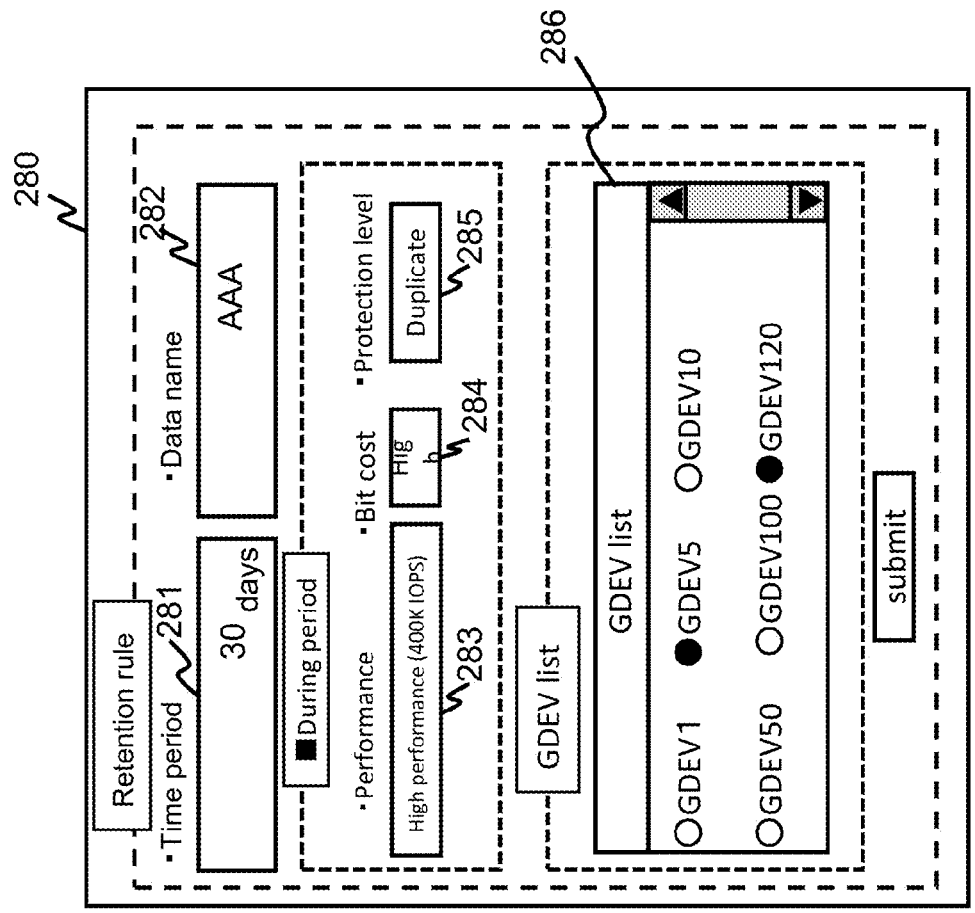
[FIG. 28]

FIG. 28 shows an example of the GDEV list display screen.

The GDEV list display screen 280, for example, is displayed on the host 10 (or on an input/output apparatus coupled to the data management apparatus 50) in Step S1604 of the input processing shown in FIG. 16. The GDEV list display screen 280 comprises, as retention rule display fields specified by the user in the retention rule input screen 270, a time period display field 281 denoting a time period, a data name display field 282 denoting a data name, a within-period performance display field 283 denoting the within-period GDEV attribute, a within-period bit cost display field 284, and a within-period protection level display field 285. The GDEV list display screen 280 also comprises a GDEV list 286. The GDEV number of one or more GDEVs conforming to the user-specified retention rule are displayed in the GDEV list 286, and an arbitrary GDEV can be selected. In the GDEV list 286 here, the number of selectable GDEVs constitutes a number corresponding to the protection level of the protection level display field 285.

Specifically, for example, in a case where volume data is to be stored in duplicate in the GDEVs "GDEV 5" and "GDEV 120", the radio buttons corresponding to "GDEV 5" and "GDEV 120" may be selected in the GDEV list 286 as shown in FIG. 28.

Figure 29:
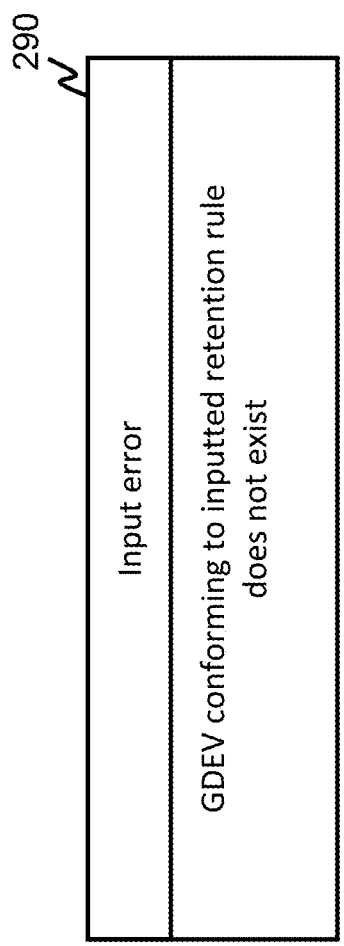
[FIG. 29]

FIG. 29 shows an example of an error display screen.

The error display screen 290, for example, is displayed on the host 10 (or an input/output apparatus coupled to the data management apparatus 50) in a case where a GDEV conforming to the within-period GDEV attribute specified by the user in the retention rule input screen 270 does not exist in Step S1604 of the input processing shown in FIG. 16 (S1604: No). A message to the effect that a GDEV conforming to the inputted retention rule does not exist is displayed on the error display screen 290.

A continuation of the processing for the input process will be explained by referring to FIG. 17.

The data management apparatus 50 notifies the edge storage 20 of the retention rule sent from the host 10 and the GDEV number of either one or multiple user-selected GDEVs. Specifically, for example, the following processing is performed.

In Step S1607, the data management apparatus 50 receives either one or multiple GDEV numbers sent from the host 10 in Step S1605.

In Step S1608, the data management apparatus 50 references the LU information management table 901, and acquires either one or multiple combinations of the WWN (the WWN # 1001) and the LUN (LUN # 1002) corresponding to the either one or multiple GDEV numbers, which were received. Then, the data management apparatus 50 stores the acquired either one or multiple WWNs and LUNs and the retention rule data received in Step S1602 in the input parameter management table 902.

In Step S1609, the data management apparatus 50 performs identical-data management processing (refer to FIG. 19), which will be explained further below. The identical-data management process is for assigning a single (the same) identical-data management ID to the multiple GDEVs in a case where the volume data is multiplexed and managed (that is, in a case where multiple GDEV numbers were received in Step S1607).

In Step S1610, the data management apparatus 50 references the edge storage management table 904, and acquires the edge storage ID 1303 of either one or multiple edge storages 20 respectively coupled to the either one or multiple received GDEV (a combination of the WWN # 1301 and the LUN # 1302 corresponding to each GDEV number).

In Step S1611, the data management apparatus 50 notifies the either one or multiple edge storages 20 comprising the edge storage ID(s) acquired in Step S1610 of the combination of the WWN and the LUN corresponding to the either one or multiple received GDEVs.

In Step S1612, either one or multiple edge storages 20 create a host 10-recognizable LVOL, which has the same capacity as the LU indicated by the WWN and the LUN notified from the data management apparatus 50, and notifies the host 10. In so doing, the edge storage 20 records the notified WWN and LUN combination, an LVOL number, which is the identifier corresponding to the created LVOL, and its own edge storage ID in the coupled LU management table 601.

In Step S1613, the host 10 displays the LVOL notified from the edge storage 20, and ends the processing.

According to the processing described above, it is possible to identify either one or multiple GDEV conforming to the specified retention rule. Then, based on the identified GDEV, the edge storage 20 can create a LVOL for provision to the host 10.

Figure 18:
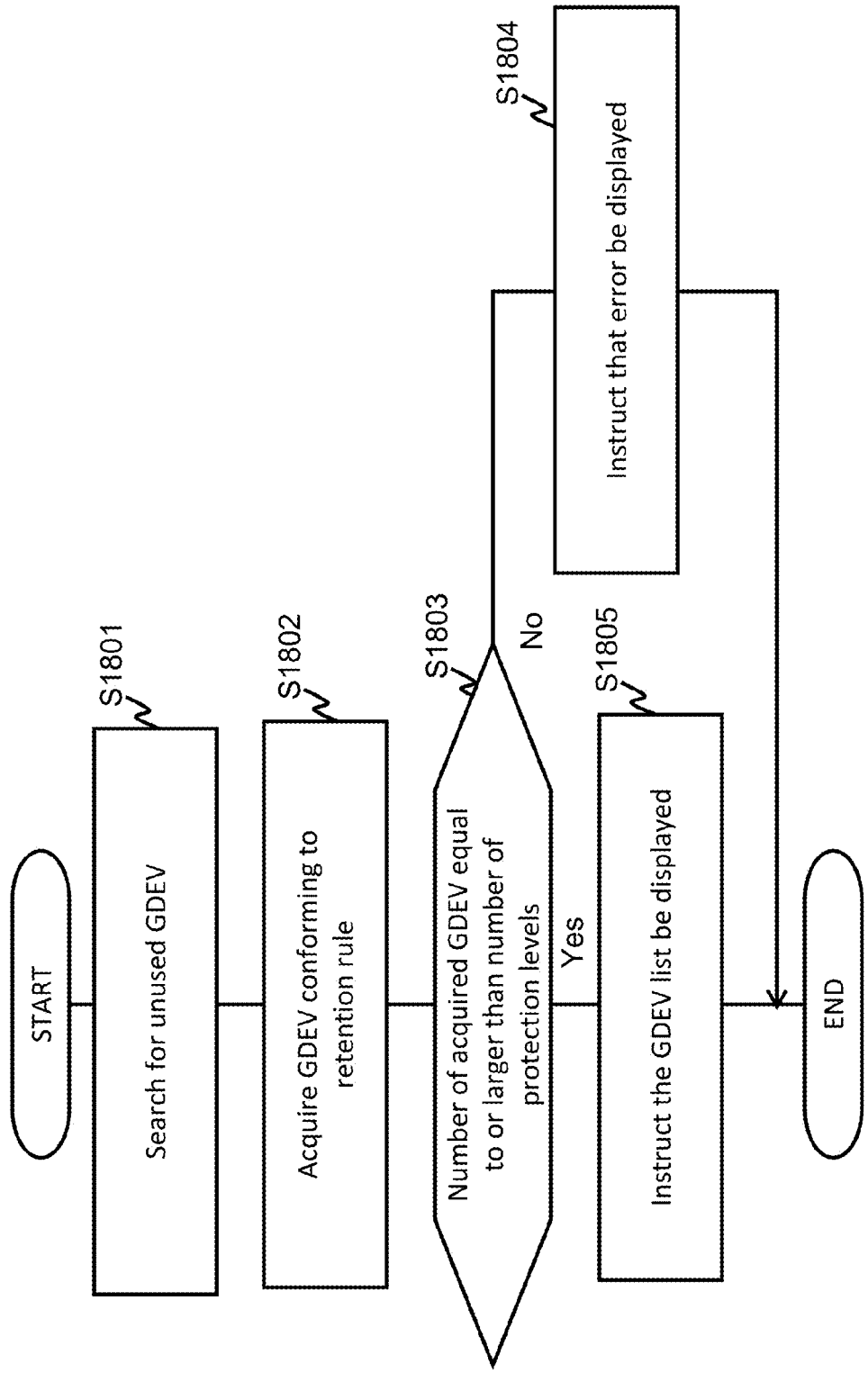
[FIG. 18]

FIG. 18 shows an example of GDEV search processing.

The GDEV search process is performed in accordance with the CPU 51 executing the GDEV search processing program 908 stored in the memory 52 of the data management apparatus 50. The GDEV search process is performed in Step S1603 of the input processing shown in FIG. 16, or in Step S2004 of the post-period GDEV selection processing shown in FIG. 20.

The data management apparatus 50 searches for either one or multiple GDEVs conforming to the retention rule, and acquires the GDEV number (s) of the GDEV(s). Specifically, for example, the following processing is performed.

In Step S1801, the data management apparatus 50 acquires the GDEV number of an unused GDEV. Specifically, for example, the data management apparatus 50 references the LU information management table 901, and acquires the GDEV number having a data (yes/no) 1006 of "0 (no)".

In Step S1802, the data management apparatus 50 acquires the GDEV number of the GDEV, which conforms to the retention rule. Specifically, for example, the data management apparatus 50 acquires the GDEV number of the GDEV conforming to the retention rule inputted by the user via the retention rule input screen 270 (refer to FIG. 27) from among the unused GDEVs acquired in Step S1801. In the GDEV search process of Step S1603 of the input processing shown in FIG. 16, the data management apparatus 50 uses the within-period retention rule to acquire the GDEV number of the retention rule-matching GDEV, and in the GDEV search process of Step S2004 of the post-period GDEV selection processing shown in FIG. 20, uses the post-period retention rule to acquire the GDEV number of the retention rule-matching GDEV.

In Step S1803, the data management apparatus 50 determines whether or not the number of GDEVs acquired in Step S1802 is equal to or larger than the number of GDEVs corresponding to the protection level inputted to the protection level input field 273c of the retention rule input screen 270 (refer to FIG. 27) (for example, in a case where the protection level inputted in the protection level input field 273c is single, the number of GDEVs is one, and in the case of a duplicate, the number of GDEVs is two). In a case where the result of the determination is that the number of acquired GDEVs is equal to or larger than the number of GDEVs corresponding to the protection level (Step S1803: Yes), the data management apparatus 50 advances the processing to Step S1805. Alternatively, in a case where the result of the determination is that the number of acquired GDEVs is less than the number of GDEVs corresponding to the protection level (Step S1803: No), the data management apparatus 50 advances the processing to Step S1804.

In Step S1805, the data management apparatus 50 instructs the host 10 (or an input/output apparatus coupled to the data management apparatus 50) to display the GDEV list display screen 280 (refer to FIG. 28), and ends the processing.

In Step S1804, the data management apparatus 50 instructs the host 10 (or an input/output apparatus coupled to the data management apparatus 50) to display the error display screen 290 (refer to FIG. 29), and ends the processing.

According to the processing described above, it is possible to search among unused GDEVs for a GDEV, which conforms to a user-specified retention rule.

Figure 19:
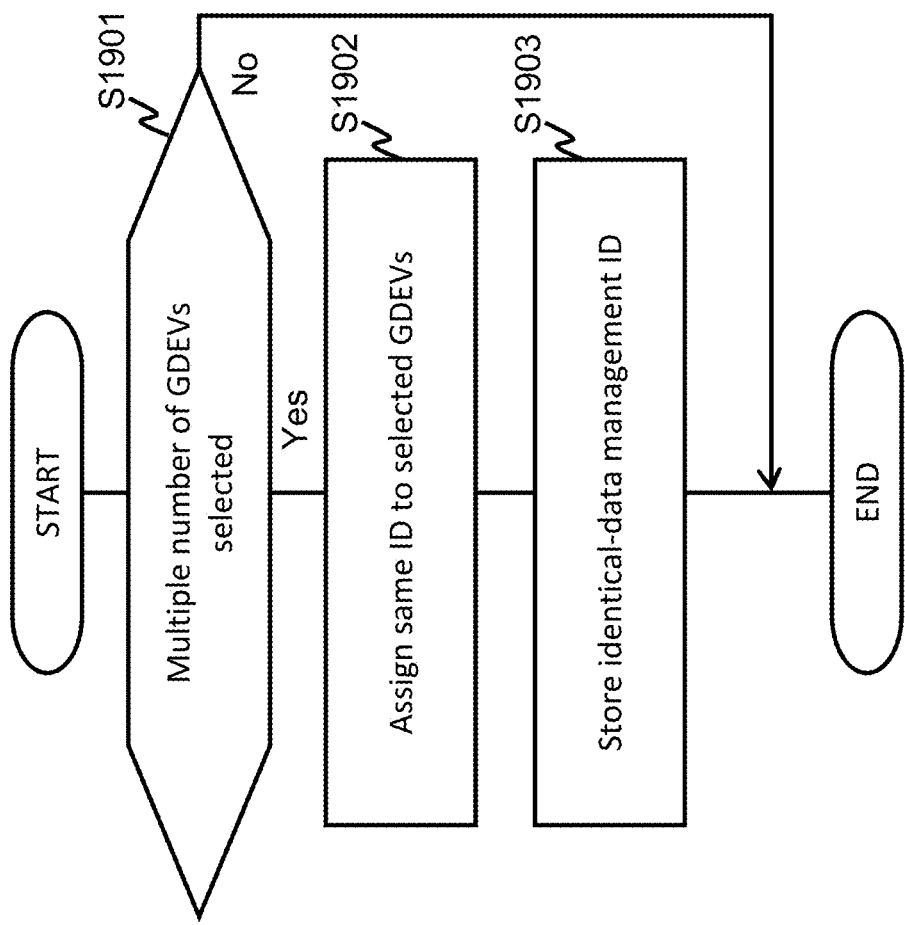
[FIG. 19]

FIG. 19 is a flowchart of identical-data management processing.

The identical-data management process is performed in accordance with the CPU 51 executing the identical-data management program 909 stored in the memory 52 inside the data management apparatus 50. The identical-date management process is performed in Step S1609 of the input processing shown in FIG. 17.

The data management apparatus 50, in a case where multiple GDEV numbers were received in Step S1607 (that is, a case in which multiple GDEVs have been selected using the GDEV list display screen 280 in a case where data has been multiplexed in accordance with the within-period retention rule), assigns a single identical-data management ID to the multiple GDEV numbers. Specifically, for example, the following processing is performed.

In Step S1901, the data management apparatus 50 determines whether or not multiple GDEV numbers have been selected by the user. In a case where the result of the determination is that multiple GDEV numbers have been selected (Step S1901: Yes), the data management apparatus 50 advances the processing to Step S1902. Alternatively, in a case where the result of the determination is that one GDEV number has been selected (Step S1901: No), the data management apparatus 50 ends the processing.

In Step S1902, the data management apparatus 50 assigns an identical-data management ID, which is the same ID, to the multiple GDEVs.

In Step S1903, the data management apparatus 50 stores the identical-data management ID for the multiple GDEVs in the identical-data management ID 1204 corresponding to each GDEV # 1203 of the identical-data management table 903, and ends the processing.

According to the processing described above, in a case where multiple GDEVs have been selected by the user, it is possible to manage these multiple GDEVs as a single group.

Figure 20:
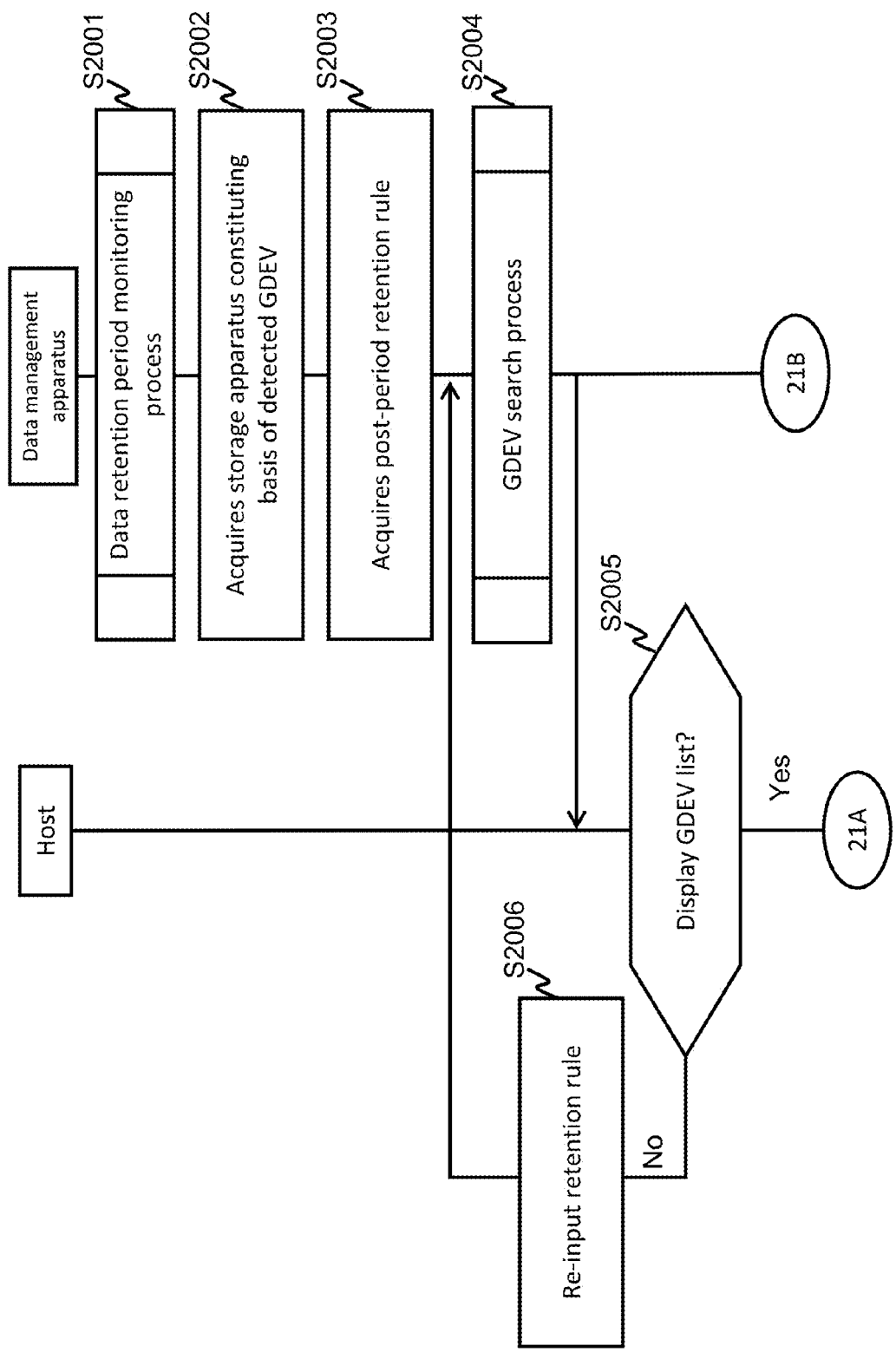
[FIG. 20]
Figure 21:
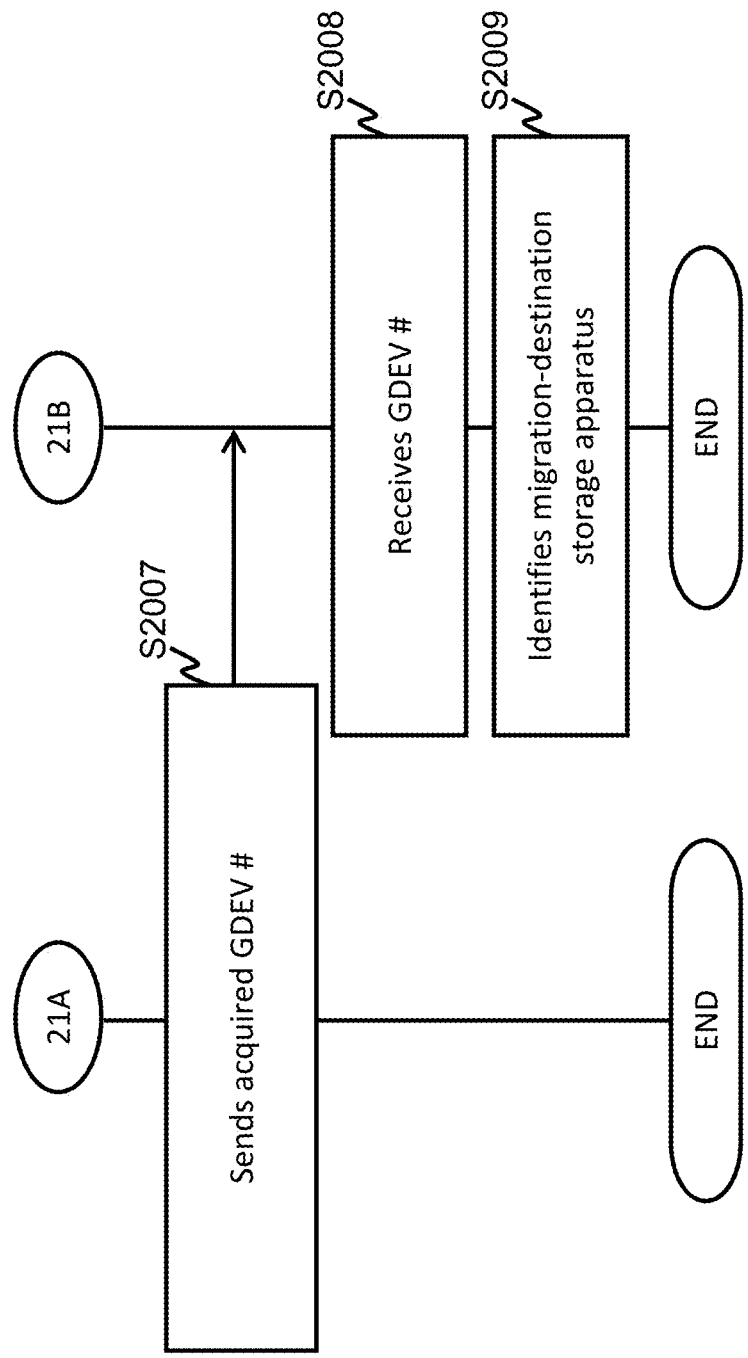
[FIG. 21]

FIG. 20 is a first flowchart of post-period GDEV selection processing. FIG. 21 is a second flowchart of post-period GDEV selection processing. In addition, the oval parts having the same reference sign in the flowcharts of FIGS. 20 and 21 indicate that the flowcharts are interlinked.

The post-period GDEV selection process is performed in accordance with the CPU 51 executing the post-period GDEV selection processing program 910 stored in the memory 52 inside the data management apparatus 50. The post-period GDEV selection process is performed for each prescribed time period (for example, one day).

The data management apparatus 50, in a case where the configured data retention period has expired, detects the storage apparatus 30 comprising the physical storage area, which constitutes the basis of the data migration-destination GDEV. Specifically, for example, the following processing is performed.

Figure 22:
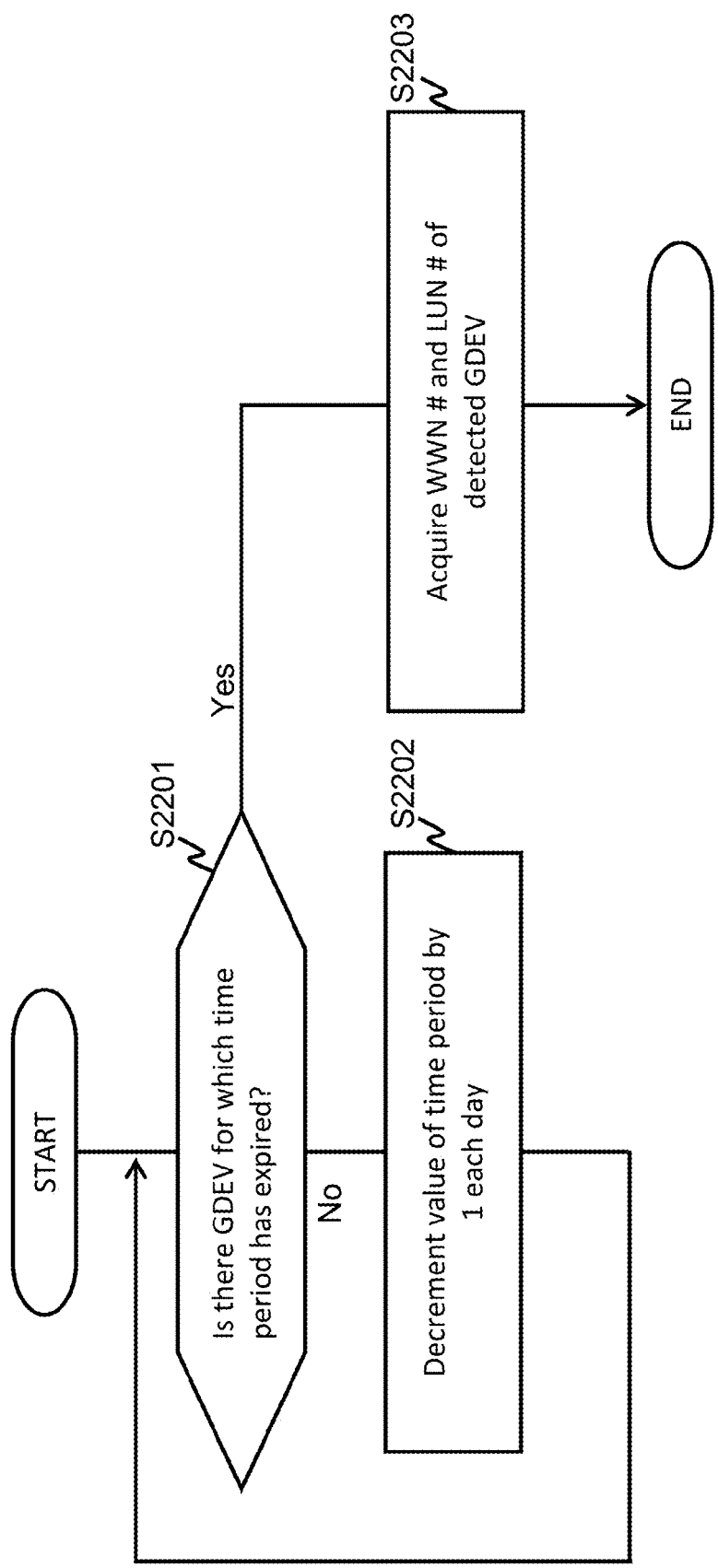
[FIG. 22]

In Step S2001, the data management apparatus 50 performs data retention period monitoring processing (refer to FIG. 22). The data retention period monitoring process is for monitoring the expiration of the data retention period configured in accordance with the retention rule, and detecting the either one or multiple GDEVs (the combination of a WWN and a LUN corresponding to each GDEV) for which the data retention period has expired. In this process, the number of GDEVs corresponding to the retention rule within-period protection level is detected.

In Step S2002, the data management apparatus 50 acquires the storage ID of either one or multiple storage apparatuses 30 comprising the physical storage area, which constitute the basis for each LU corresponding to the one or multiple GDEVs detected in Step S2001. Specifically, for example, the data management apparatus 50 references the storage management table 905 and acquires the storage ID 1403 of the one or multiple storage apparatuses 30 associated with the WWN and LUN corresponding to the GDEV number of the either one or multiple GDEVs, which have been detected.

In Step S2003, the data management apparatus 50 acquires the post-period retention rule of the detected either one or multiple GDEVs. Specifically, the data management apparatus 50 references the input parameter management table 902 and acquires the post-period performance 1108, the post-period bit cost 1109, and the post-period protection level 1110 associated with the WWN and LUN corresponding to the respective GDEV number(s) of the detected either one or multiple GDEVs.

In Step S2004, the data management apparatus 50 performs GDEV search processing (refer to FIG. 17). Then, the data management apparatus 50 sends the host 10 an instruction obtained in accordance with the GDEV search process. The data management apparatus 50, for example, performs the GDEV search processing based on the post-period retention rule (the post-period performance, bit cost, and protection level) acquired in Step S2003.

In Step S2005, the host 10 determines whether or not the instruction of Step S2004 is to display the GDEV list. In a case where the result of the determination is that the instruction of Step S2004 is to display the GDEV list (Step S2005: Yes), the host 10 displays the GDEV list display screen (for example, FIG. 28), and advances the processing to Step S2007 of FIG. 21. Alternatively, in a case where the result of the determination is that the instruction of Step S2004 is not for displaying the GDEV list (Step S2005: No), the host 10 displays a screen other than the GDEV list display screen (for example, the error screen 290 of FIG. 29) and advances the processing to Step S2006.

In Step S2006, the host 10 displays a screen urging the re-input of the retention rule (for example, the retention rule input screen 270 of FIG. 27), and sends retention rule data based on a user-inputted retention rule to the data management apparatus 50.

In Step S2007 of FIG. 21, the host 10 sends the data management apparatus 50 the GDEV number of either one or multiple GDEVs selected by the user from the GDEV list 286 of the GDEV list display screen 280.

In Step S2008, the data management apparatus 50 receives the either one or multiple GDEV numbers sent from the host 10.

In Step S2009, the data management apparatus 50, based on the either one or multiple GDEV numbers received in Step S2008, identifies the either one or multiple storage apparatuses 30 (migration-destination storage apparatus(es) 30) comprising the physical storage area constituting the LU corresponding to the either one or multiple GDEVs, which constitute the migration destination of the volume data. Specifically, the data management apparatus 50 references the storage management table 905, identifies the storage ID 1403 corresponding to the respective combinations of the WWN # 1401 and the LUN # 1402, which correspond to the received one or multiple GDEV numbers, and ends the processing.

According to the processing described above, it is possible to identify a migration-destination storage apparatus 30 based on a user-selected GDEV.

FIG. 22 is a flowchart of data retention period monitoring processing.

The data retention period monitoring process is performed in accordance with the CPU 51 executing the data retention period monitoring processing program 911 stored in the memory 52 of the data management apparatus 50. The data retention period monitoring process is performed in Step S2001 of the post-period GDEV selection processing shown in FIG. 20.

The data management apparatus 50 acquires the WWN and the LUN of a GDEV for which the retention rule time period has expired. Specifically, for example, the following processing is performed.

In Step S2201, the data management apparatus 50 determines whether or not a period-expired GDEV exists. Specifically, for example, the data management apparatus 50 references the input parameter management table 902 and determines whether or not there exists a GDEV (that is, a combination of the WWN # 1101 and the LUN # 1102) for which the time period 1104 is "0". In a case where the result of the determination is that there is no GDEV for which the time period 1104 is "0" (Step S2201: No), the data management apparatus 50 advances the processing to Step S2202. Alternatively, in a case where the result of the determination is that a GDEV for which the time period 1104 is "0" exists (Step S2201: Yes), the data management apparatus 50 advances the processing to Step S2203.

In Step S2202, the data management apparatus 50 decreases the time period 1104 of each entry in the input parameter management table 902 by one day (subtracts one from the value of the time period 1104).

In Step S2203, the data management apparatus 50 references the input parameter management table 902, acquires the GDEV (the combination of the WWN # 1101 and the LUN # 1102) for which the time period 1104 is "0", decreases the time period 1104 of all the other entries for which the time period 1104 is not "0" by one day (subtracts one for the value of the time period 1104), and ends the processing.

According to the processing described above, it is possible to manage the retention period of the volume data, and, in addition, it is possible to acquire information (the WWN and the LUN) of a GDEV storing volume data for which the retention period has expired.

Figure 23:
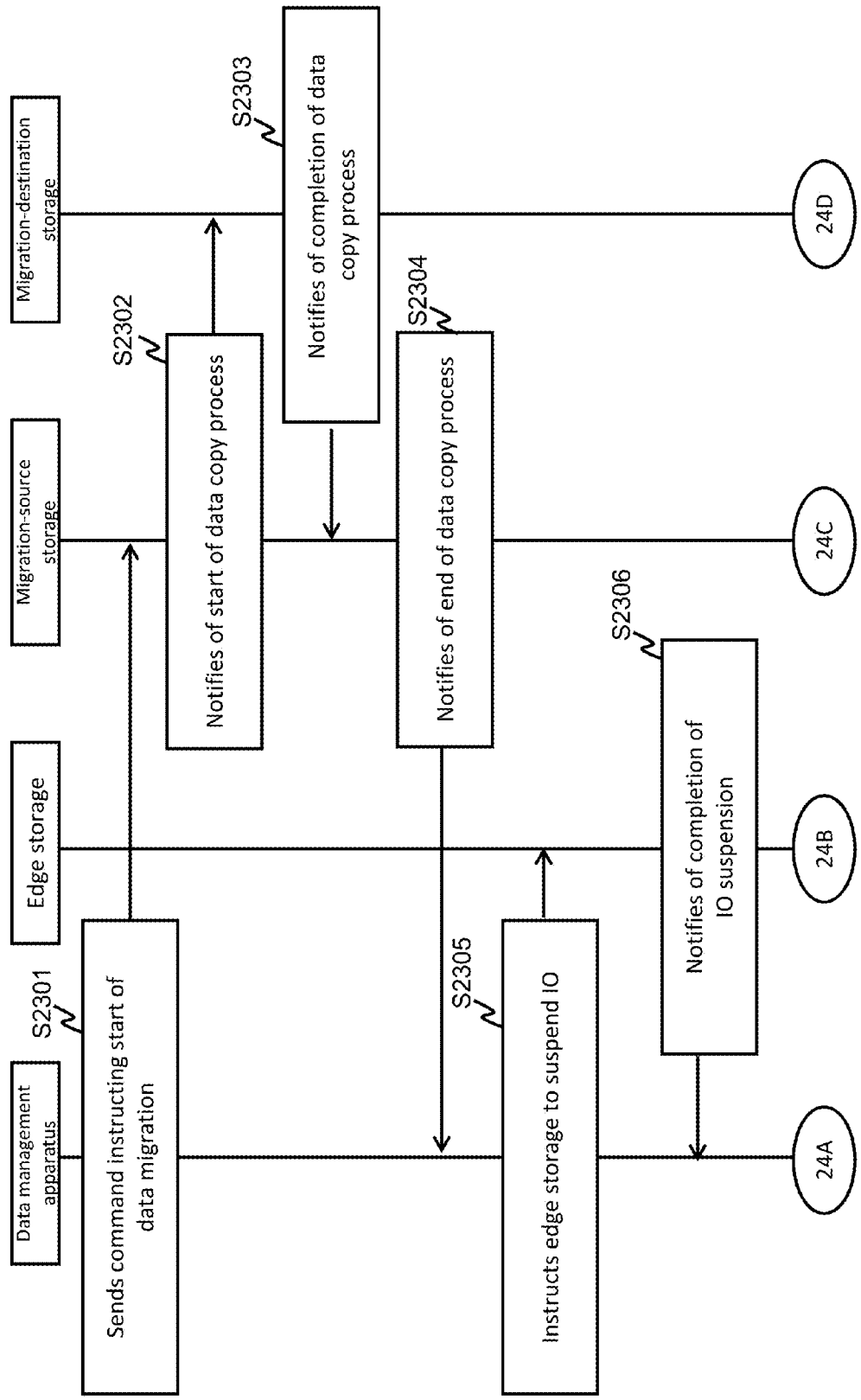
[FIG. 23]
Figure 24:
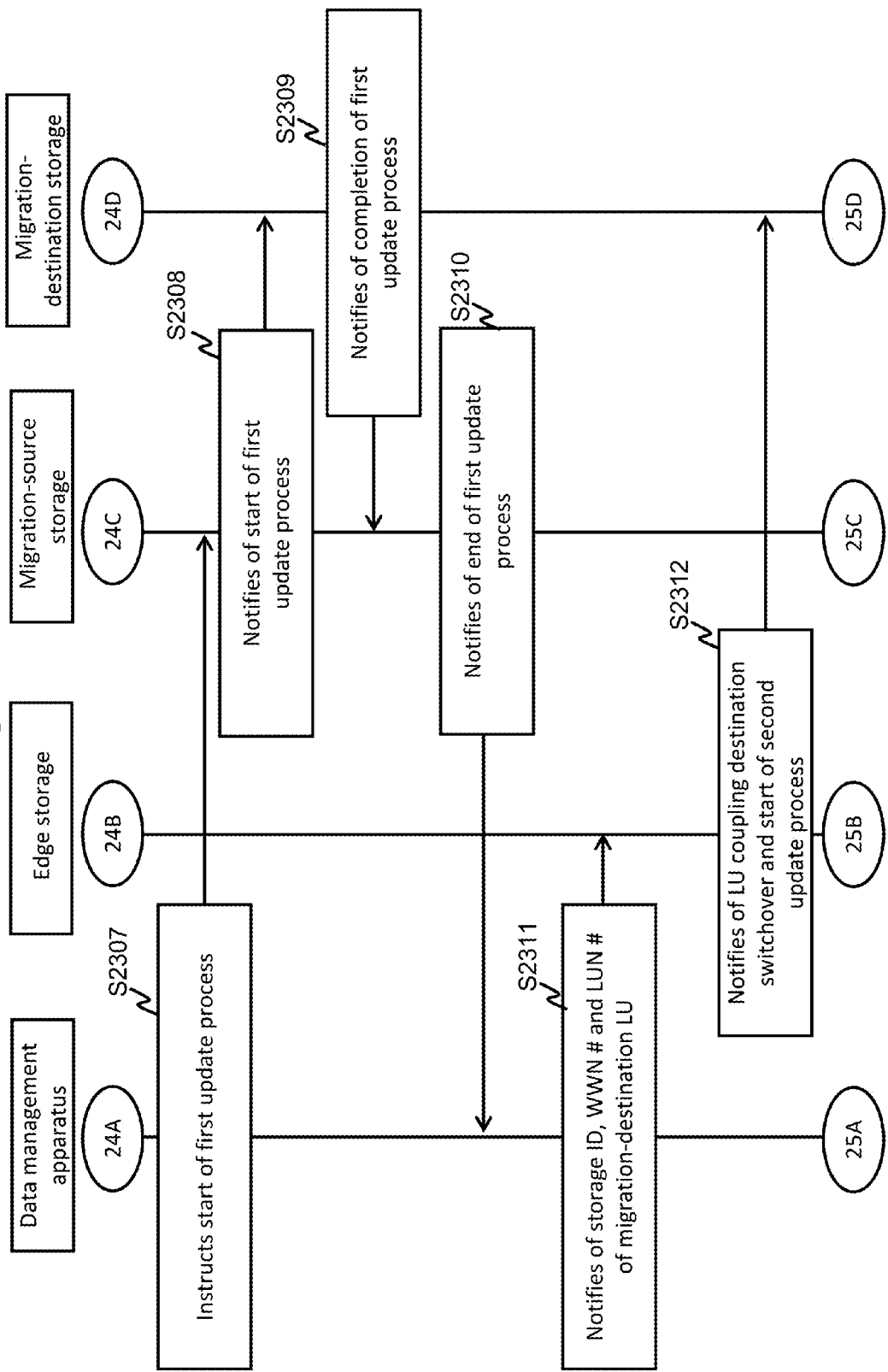
[FIG. 24]
Figure 25:
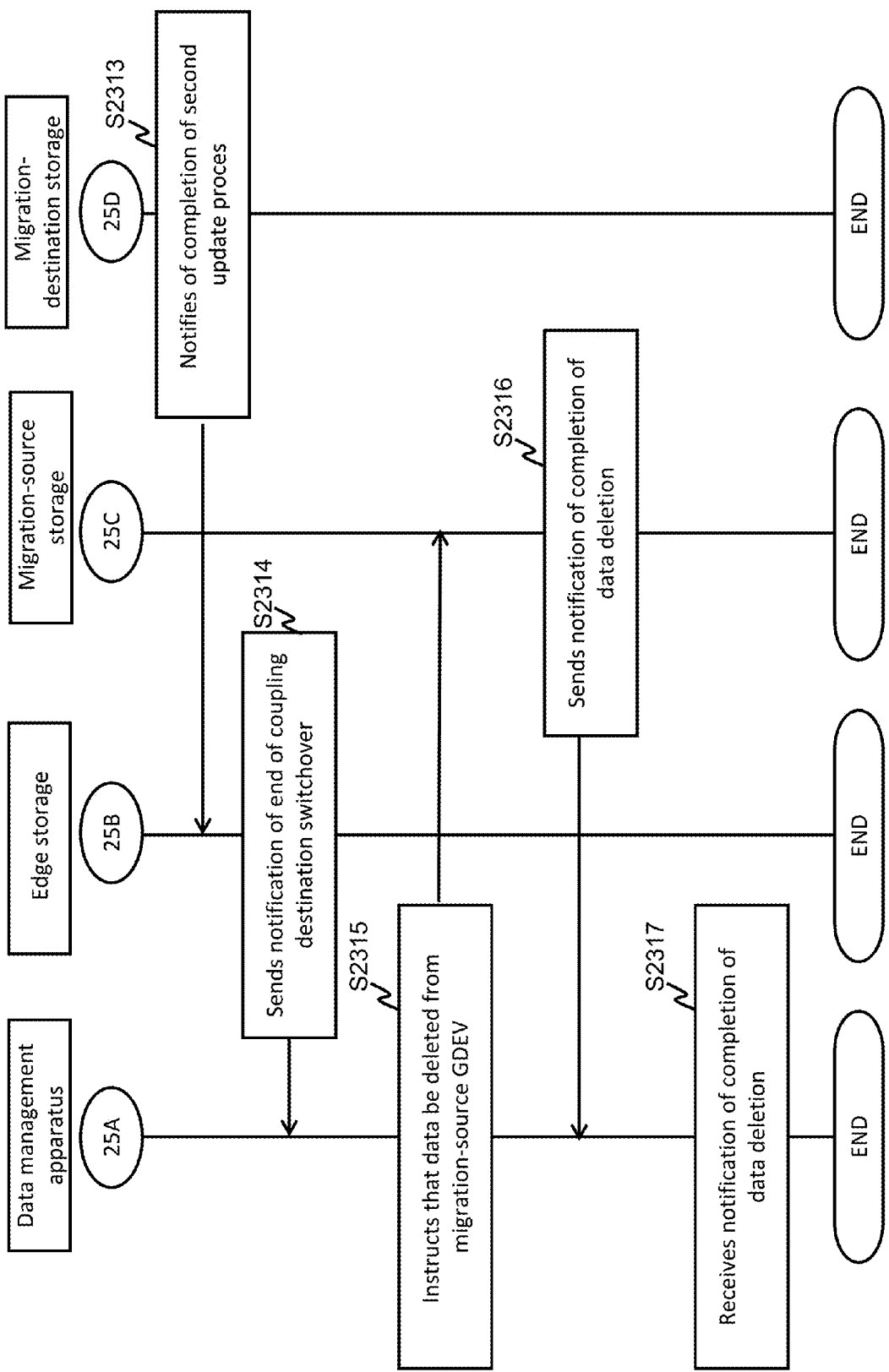
[FIG. 25]

FIG. 23 is a first flowchart of change retention rule processing related to Example 1. FIG. 24 is a second flowchart of change retention rule processing related to Example 1. FIG. 25 is a third flowchart of change retention rule processing related to Example 1. In addition, the oval parts having the same reference sign in the flowcharts of FIGS. 23 through 25 indicate that the flowcharts are interlinked.

The processing of the data management apparatus 50 in the change retention rule process is performed in accordance with the CPU 51 executing the change retention rule program 912 stored in the memory 52 of the data management apparatus 50. The change retention rule process, for example, is performed in a case where a period-expired GDEV exists, and, in addition, in a case in which the retention rule for the GDEV, which should store the post-period volume data, differs from the retention rule for the GDEV, which should store the within-period volume data. In this example, an example of a case in which the performance and bit cost of the GDEV, which should store the volume data, differs during the period and after the period, will be explained. Furthermore, in this example, it is supposed that the volume data protection level remains single both during the period and after the period.

In the change retention rule process, volume data stored in the LU corresponding to the GDEV (hereinafter referred to as migration-source GDEV), which conforms to the within-period retention rule, is migrated to the LU corresponding to the GDEV (hereinafter referred to as migration-destination GDEV), which conforms to the post-period retention rule. Here, the storage apparatus 30 comprising the physical storage area, which constitutes the basis of the LU corresponding to the migration-source GDEV, will be called the migration-source storage apparatus, and the storage apparatus 30 comprising the physical storage area, which constitutes the basis of the LU corresponding to the migration-destination GDEV, will be called the migration-destination storage apparatus.

An IO command (including write subdata based on a write command) from an edge storage 20 with respect to the volume data of the migration-source GDEV is temporarily held in the migration-source storage apparatus 30 while the migration process (initial copy process) is being performed for the volume data at the start of the migration from the migration-source GDEV to the migration-destination GDEV. Then, after the migration process for the volume data at the start of the migration from the migration-source GDEV to the migration-destination GDEV has ended, the migration-source storage apparatus 30 performs an update process (SD-SD update process) with respect to the migration-destination GDEV on the write subdata based on the write command, which had been held during the initial copy process.

An IO request (including write data based on a write request) from the host 10 is temporarily held by the edge storage 20 during the SD-SD update processing. Then, after the SD-SD update processing has ended, the edge storage 20 performs an update process (ES-SD update process) with respect to the migration-destination GDEV on the write request-based write data, which had been held during the SD-SD update process.

In Step S2301 of FIG. 23, the data management apparatus 50 sends the migration-source storage apparatus 30 a command instructing the start of a data migration. Specifically, the data management apparatus 50 issues a command to the migration-source storage apparatus 30 instructing that the migration of volume data from the migration-source GDEV to the migration-destination GDEV be started, and, in addition, notifies the migration-source storage apparatus 30 of the WWN and the LUN corresponding to the migration-source GDEV and the WWN and the LUN of the migration-destination GDEV.

In Step S2302, the migration-source storage apparatus 30 receives the command from the data management apparatus 50 instructing the start of the data migration, specifies the WWN and the LUN corresponding to the migration-destination GDEV to the migration-destination storage apparatus 30, and notifies the migration-destination storage apparatus 30 of the start of the data copy. Then, the migration-source storage apparatus 30, upon receiving a response to the data copy start notification from the migration-destination storage apparatus 30, starts the initial copy process for copying the volume data inside the LU corresponding to the migration-source GDEV to the LU corresponding to the migration-destination GDEV.

In a case where a write command for the LU corresponding to the migration-source GDEV is sent from the edge storage 20 during the initial copy process, the migration-source storage apparatus 30 stores the write command, the write subdata (hereinafter referred to as first update data), and information denoting a storage location for the first update data in the LU, in the CM 342. Furthermore, the information denoting the first update data storage location in the LU may be managed using a bitmap. Specifically, for example, the LU is configured using multiple storage areas of a prescribed size (for example, a block), each prescribed size storage area of the LU is associated with a respective bit of a bitmap, and whether or not update data is being stored is managed in accordance with the value of the relevant bit. The management of a storage location using a bitmap is performed as follows. That is, all of the bits of the bitmap are configured to an initial value (for example, "0") until the point-in-time at which the initial copy processing is started. Then, in a case where a write command has been received subsequent to the start of the initial copy process, the bit, which corresponds to the storage area constituting the first update data storage location corresponding to the write command, is updated, for example, to "1". This makes it possible to identify the storage area in which the first update data is stored by referencing the bitmap. Furthermore, in a case where a write command with respect to the LU corresponding to the migration-source GDEV is sent from the edge storage 20 during the initial copy process, the migration-source storage apparatus 30 may issue an error notification. Thus, since it is possible to appropriately manage a write command and write subdata generated during the initial copy process, the host 10 need not suspend processing during the initial copy process.

In Step S2303, after the initial copy processing has been completed, the migration-destination storage apparatus 30 issues a notification to the migration-source storage apparatus 30 to the effect that the initial copy process is complete.

In Step S2304, the migration-source storage apparatus 30 receives the initial-copy-process-complete notification from the migration-destination storage apparatus 30, and issues a notification to the data management apparatus 50 to end the initial copy process.

In Step S2305, the data management apparatus 50, upon receiving the end-initial-copy-process notification from the migration-source storage apparatus 30, instructs the edge storage 20, which is in charge of sending the IO command for writing data to the migration-source GDEV, to suspend the IC). Specifically, the data management apparatus 50 references the edge storage management table 904 and acquires the edge storage ID 1303, which corresponds to the combination of the WWN # 1301 and the LUN # 1302 corresponding to the migration-source GDEV. Then, the data management apparatus 50 issue an instruction to the edge storage 20 of the acquired edge storage ID to suspend the IO with respect to the migration-source GDEV (that is, the LU of the WWN and the LUN combination corresponding to the migration-source GDEV).

In Step S2306, the edge storage 20 receives the IO suspension instruction, and based on the instruction, suspends sending the IO command to the migration-source storage apparatus 30 with respect to the IO request from the host 10, and issues an IO-suspension-complete notification to the data management apparatus 50. In a case where a write request has been received from the host 10 specifying the LVOL allocated to the migration-source GDEV during the state in which the sending of the IO command is suspended, the edge storage 20 stores the write request, the write data (hereinafter referred to as second update data), and information denoting a storage location for the second update data in the LU. The information denoting the second update data storage location in the LU may be managed using a bitmap. Specifically, for example, the LU is configured using multiple storage areas of a prescribed size (for example, a block), each prescribed size storage area of the LU is associated with a respective bit of a bitmap, and whether or not second update data is being stored is managed in accordance with the value of the relevant bit. The management of a storage location using a bitmap is performed as follows. That is, all of the bits of the bitmap are configured to an initial value (for example, "0") until the point-in-time at which the sending of the IO command is suspended. Then, in a case where a write command has been received subsequent to the start of the SD-SD update process, the bit, which corresponds to the storage area constituting the second update data storage location corresponding to the write command, is updated, for example, to "1". This makes it possible to identify the storage area in which the second update data is stored by referencing the bitmap. Furthermore, in a case where a read request specifying the LVOL allocated to the migration-source GDEV has been received, the edge storage 20 may notify the host 10 of an error. Thus, since it is possible to appropriately manage an IO command and write data generated during the SD-SD update process, the host 10 need not suspend processing during the SD-SD update process.

In Step S2307 of FIG. 24, the data management apparatus 50 issues the migration-source storage apparatus 30 an instruction to start the SD-SD update processing (the first update process). Specifically, for example, the data management apparatus 50 instructs the migration-source storage apparatus 30 to start the process for copying the first update data to the migration-destination GDEV.

In Step S2308, the migration-source storage apparatus 30 receives the instruction to start the SD-SD update process, and instructs the migration-destination storage apparatus 30 to start SD-SD update processing. Then, after receiving a response from the migration-destination storage apparatus 30 with respect to the instruction to start the SD-SD update process, the migration-source storage apparatus 30 performs SD-SD update processing with respect to the migration-destination storage apparatus 30.

The SD-SD update process is for storing the first update data in the LU corresponding to the migration-destination GDEV based on the information (for example, the bitmap) denoting the first update data storage location in the LU.

In Step S2309, after the SD-SD update processing has been completed, the migration-destination storage apparatus 30 issues a notification to the migration-source storage apparatus 30 to the effect that the SD-SD update process is complete (completion of first update process).

In Step S2310, the migration-source storage apparatus 30 receives the notification of the completion of the SD-SD update process from the migration-destination storage apparatus 30, and notifies the data management apparatus 50 that SD-SD update processing has ended.

In Step S2311, the data management apparatus 50 receives the notification that SD-SD update processing has ended from the migration-source storage apparatus 30, and notifies the edge storage 20 in the state of suspending the IO to the migration-source GDEV of the WWN and the LUN corresponding to the migration-destination GDEV. Specifically, for example, the data management apparatus 50 references the storage management table 905 and acquires the storage ID 1403 of the migration-destination storage apparatus 30, which corresponds to the WWN and the LUN corresponding to the migration-destination GDEV. Then, the data management apparatus 50 notifies the edge storage 20, which is suspending the IO to the migration-source GDEV, of the storage ID of the migration-destination storage apparatus 30 and the WWN and the LUN corresponding to the migration-destination GDEV.

In Step S2312, the edge storage 20 receives the migration-destination storage ID and the WWN and the LUN corresponding to the migration-destination GDEV, and switches the coupling to the migration-source GDEV of the migration-source storage apparatus 30 to the coupling to the migration-destination GDEV of the migration-destination storage apparatus 30. Specifically, the edge storage 20 changes the WWN # 702 and the LUN # 703, which correspond to the LVOL # 701 corresponding to the migrated volume data in the coupled LU management table 601, from the migration-source GDEV (the WWN and the LUN corresponding to the migration-source GDEV) to the migration-destination GDEV (the WWN and the LUN corresponding to the migration-destination GDEV). In accordance with this, thereafter an IO command for this LVOL will not be sent to the migration-source storage apparatus 30. Then, the edge storage 20 instructs the migration-destination storage apparatus 30 to start ES-SD update processing (the second update process). After having received a response to the instruction for starting the ES-SD update process from the migration-destination storage apparatus 30, the edge storage 20 performs the ES-SD update processing with respect to the migration-destination storage apparatus 30.

The ES-SD update process is for storing the second update data in the LU corresponding to the migration-destination GDEV based on the information (for example, the bitmap) denoting the second update data storage location in the LU.

In Step S2313 of FIG. 25, after the ES-SD update processing has been completed, the migration-destination storage apparatus 30 notifies the edge storage 20 that the ES-SD update process is complete.

In Step S2314, the edge storage 20 receives the notification that the ES-SD update process is complete from the migration-destination storage apparatus 30, and issues notifications to the data management apparatus 50 to the effect that the ES-SD update process has ended and the switching of the coupling destination has ended.

In Step S2315, the data management apparatus 50 receives from the edge storage 20 the notifications that the ES-SD update process and the switching of the coupling destination have ended, and issues a notification to the migration-source storage apparatus 30 instructing that the volume data stored in the LU corresponding to the migration-source GDEV be deleted.

In Step S2316, the migration-source storage apparatus 30 deletes the volume data stored in the LU corresponding to the migration-source GDEV. This makes it possible to use the LU corresponding to the migration-source GDEV to store other volume data. Then, the migration-source storage apparatus 30 notifies the data management apparatus 50 to the effect that the deletion of the volume data has been completed.

In Step S2317, the data management apparatus 50 receives the notification to the effect that the deletion of the volume data from the migration-source storage apparatus 30 has been completed, and ends the processing.

Figure 26:
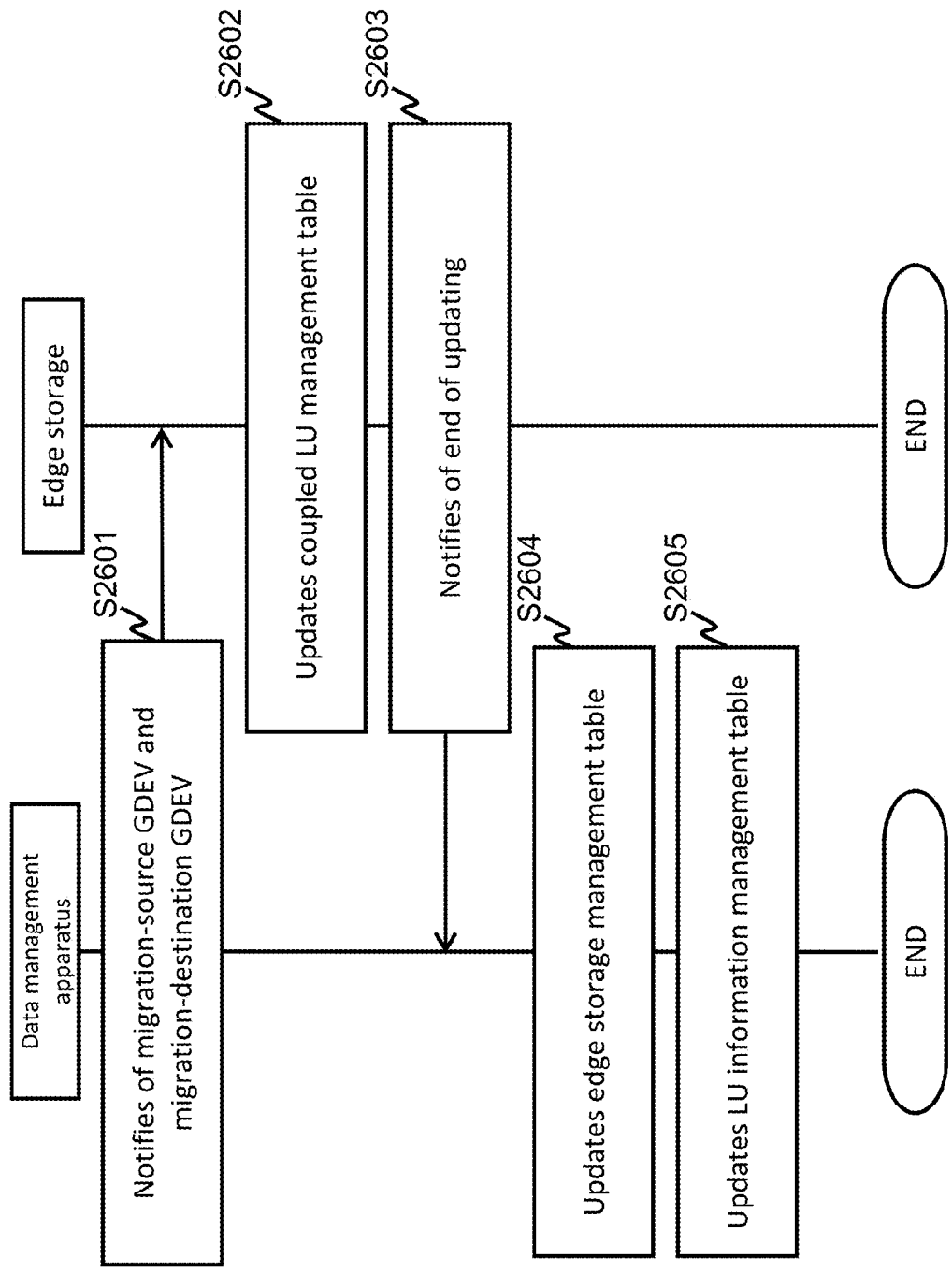
[FIG. 26]

FIG. 26 is a flowchart of table update processing. The table update process, for example, is executed in Steps S2311 and S2312 of the change retention rule process.

In Step S2601, the data management apparatus 50 references the edge storage management table 904, and sends the WWN and the LUN corresponding to the migration-source GDEV and the WWN and the LUN corresponding to the migration-destination GDEV to the either one or multiple edge storages 20, which are coupled to the migration-source GDEV, and to the either one or multiple edge storages 20, which are coupled to the migration-destination GDEV.

In Step S2602, the edge storage 20, which received the notification from the data management apparatus 50, updates the coupled LU management table 601. Specifically, for example, the edge storage 20 deletes all information other than the LVOL 701 information from the row in the coupled LU management table 601 in which the combination of the WWN and the LUN corresponding to the migration-source GDEV exists. Next, the edge storage 20 adds the WWN and the LUN corresponding to the migration-destination GDEV and its own edge storage ID to the row of the relevant LVOL 701. This makes it possible to appropriately discern the GDEV storing the LVOL 701, that is, the migration-destination GDEV in accordance with referencing the coupled LU management table 601.

In Step S2603, the edge storage 20 sends the data management apparatus 50 a notification to the effect that the updating of the coupled LU management table 601 has ended.

In Step S2604, the data management apparatus 50, upon receiving the notification from the edge storage 20 to the effect that the updating of the coupled LU management table 601 has ended, updates the edge storage management table 904. Specifically, the data management apparatus 50 changes the edge storage ID 1303, which corresponds to the WWN and the LUN corresponding to the migration-destination GDEV, to the edge storage ID associated with the WWN and the LUN corresponding to the migration-source GDEV in the edge storage management table 904.

In Step S2605, the data management apparatus 50 updates the LU information management table 901. Specifically, for example, the data management apparatus 50 configures the data (yes/no) 1006 corresponding to the GDEV # of the migration-destination GDEV to "1 (yes)", and configures the data (yes/no) 1006 corresponding to the GDEV # of the migration-source GDEV to "0 (no)" in the LU information management table 901.

According to the example described hereinabove, while initial copy processing is being performed from the migration-source GDEV to the migration-destination GDEV, update data (first update data) based on a write command sent to the migration-source GDEV is held in a bitmap, which shows the update data storage location in the LU, and, in addition, in the migration-source storage apparatus 30. Then, a second update data, which is based on a write request sent from the host 10 during a SD-SD update process for the first update data, is held in a bitmap, which shows the second update data storage location in the LU, and, in addition, in the edge storage 20. After the SD-SD update process has ended, the edge storage 20 switches the coupling destination from the migration-source GDEV to the migration-destination GDEV and performs ES-SD update processing for the second update data. This makes it possible to perform processing for migrating volume data to a GDEV having a different attribute without the host 10 suspending the generation of a write request, that is, while the host 10 runs an application.

According to the example described hereinabove, since there is no need to change the configuration in the host 10, it is not necessary to configure application software in each host 10, eliminating reliance on the OS and application software by the host 10.

In addition, since the storage locations of the first update data and the second update data are managed using bitmaps, processing efficiency can be enhanced as only updated data is migrated.

EXAMPLE 2

Example 2 is one in which the change retention rule process differs from that of Example 1. This example provides an example in which, in addition to the GDEV performance and bit cost, the protection level (volume data multiplexing) is also changed subsequent to the time period. An explanation will be given here in which it is supposed that the within-period protection level is made duplicated, that is, the volume data is managed in duplicate, and the post-period protection level is single, that is, the volume data is managed singly. It is also supposed that one of the two GDEV, which respectively store volume data conforming to the within-period retention rule, i.e., the main GDEV, is the migration-source GDEV. It is supposed that the main GDEV is a GDEV for which a data read and write are performed directly; it is not a backup GDEV. Furthermore, in the following explanation, the same reference signs may be assigned to configurations and processing steps, which are the same as those of Example 1, and duplicate explanations may be omitted.

Figure 30:
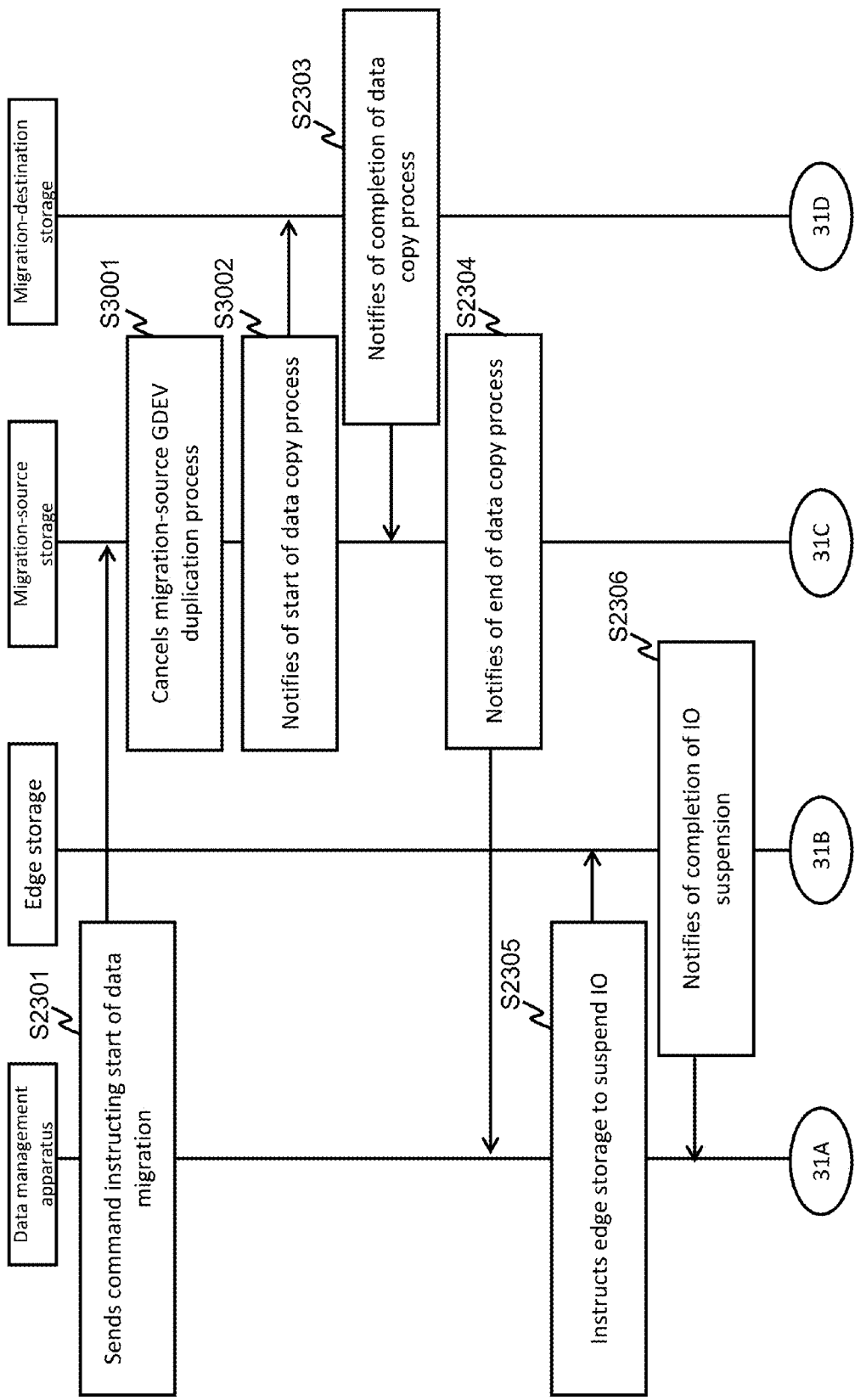
[FIG. 30]
Figure 31:
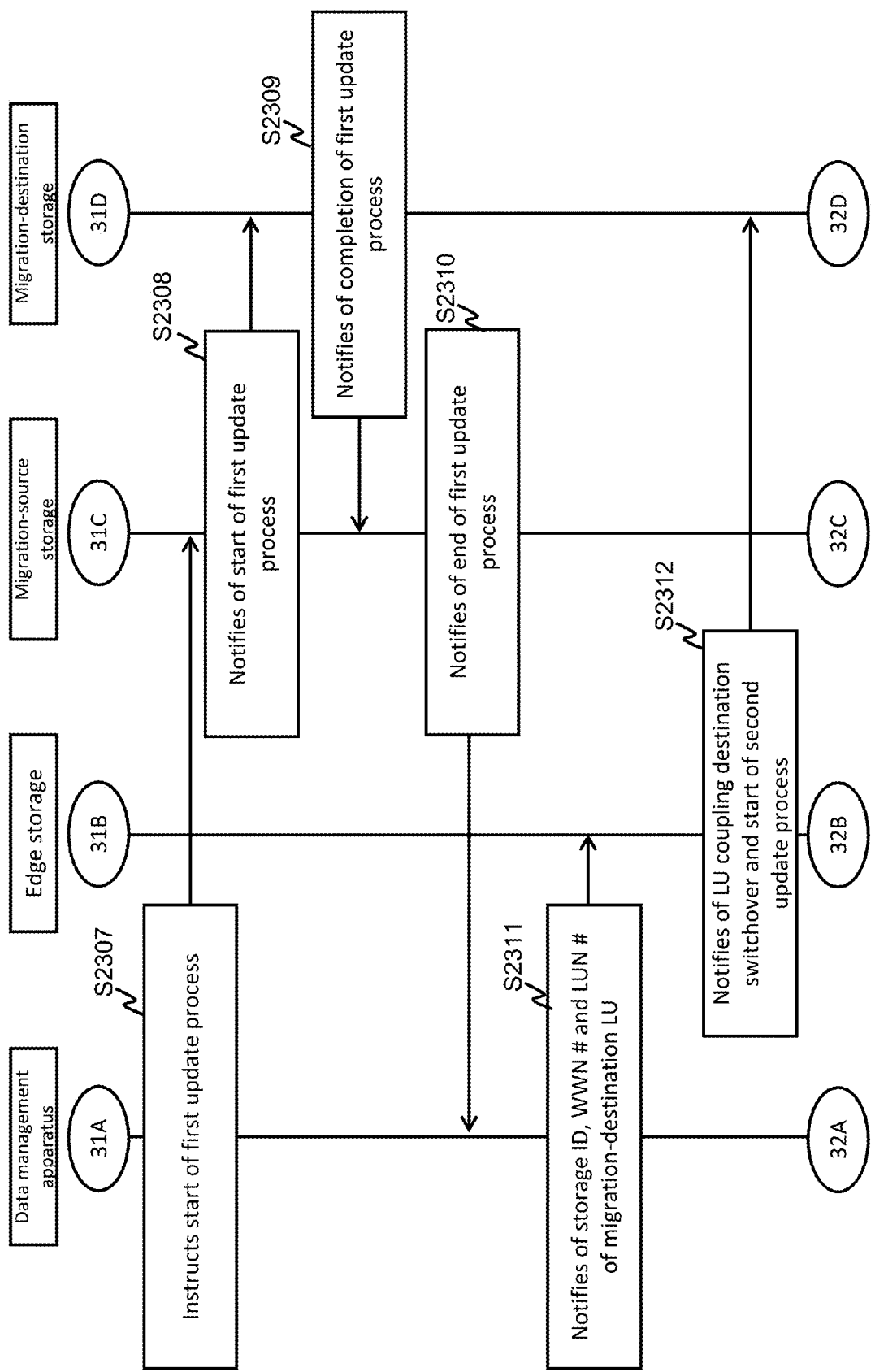
[FIG. 31]
Figure 32:
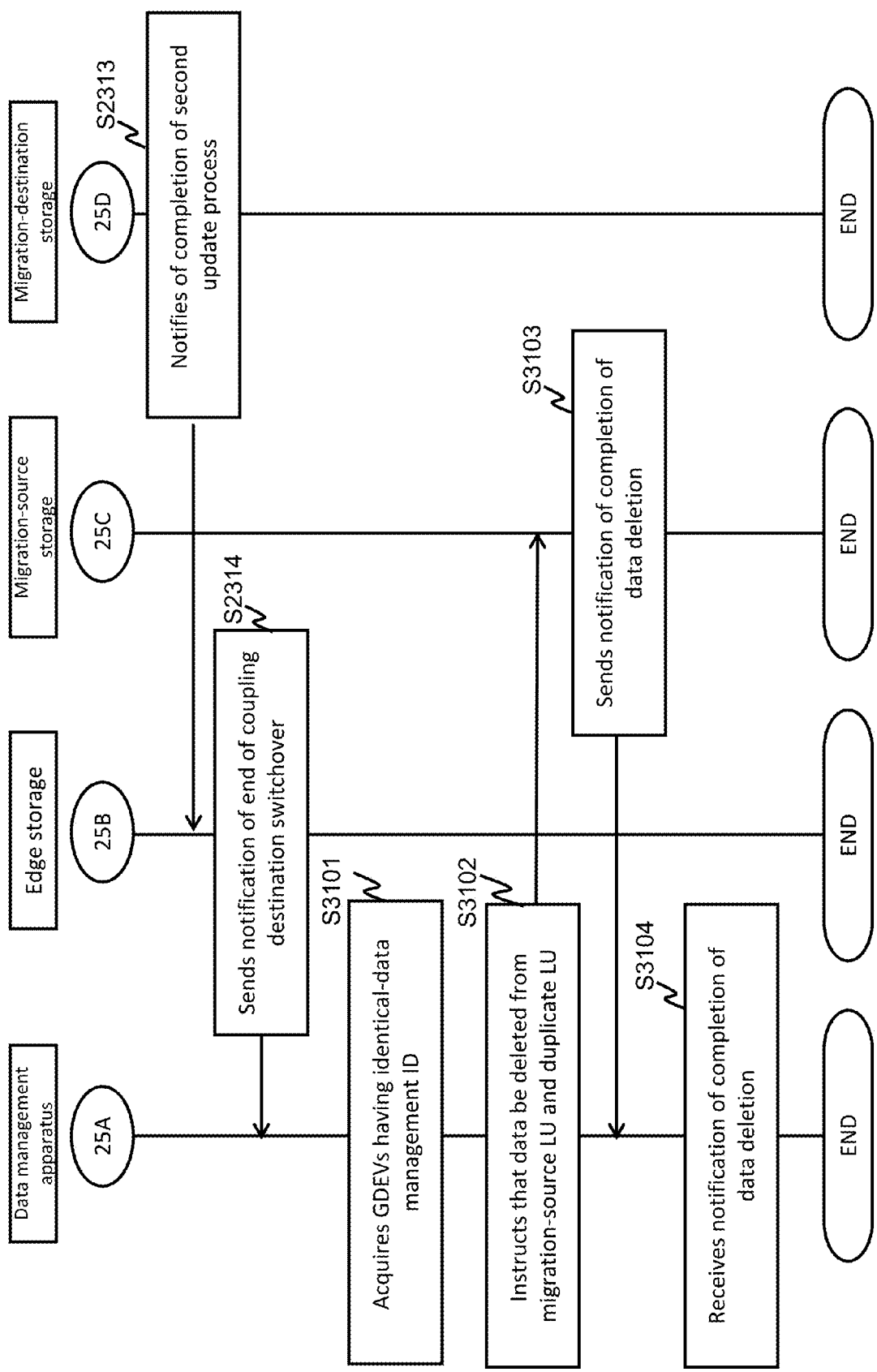
[FIG. 32]

FIG. 30 is a first flowchart of change retention rule processing related to Example 2. FIG. 31 is a second flowchart of change retention rule processing related to Example 2. FIG. 32 is a third flowchart of change retention rule processing related to Example 2. In addition, the oval parts having the same reference sign in the flowcharts of FIGS. 30 through 32 indicate that the flowcharts are interlinked.

In the change retention rule processing related to Example 2, as shown in FIG. 30, Steps S3001 and S3002 are executed in place of Step S2302 of the change retention rule processing related to Example 1.

In Step S2301, the data management apparatus 50 sends the migration-source storage apparatus 30 a command instructing the start of a data migration.

In Step S3001, the migration-source storage apparatus 30 receives the command from the data management apparatus 50 instructing the start of a data migration. Then, the migration-source storage apparatus 30 cancels duplication processing (backup processing) for volume data stored in the LU corresponding to the migration-source GDEV. Specifically, for example, the migration-source storage apparatus 30 cancels the volume data synchronism of the LU corresponding to the migration-source GDEV with respect to the LU corresponding to the backup GDEV.

In Step S3002, the migration-source storage apparatus 30 specifies the WWN and the LUN corresponding to the migration-destination GDEV and notifies the migration-destination storage apparatus 30 of the start of an initial copy process. Then, the migration-source storage apparatus 30, after receiving a response from the migration-destination storage apparatus 30 to the notification of the start of the initial copy process, starts the initial copy process, which copies the volume data in the LU corresponding to the migration-source GDEV to the LU corresponding to the migration-destination GDEV.

In the change retention rule processing related to Example 2, as shown in FIG. 32, Steps S3101 through S3104 are executed in place of Steps S2315 through S2317 of the change retention rule processing related to Example 1.

In Step S3101, the data management apparatus 50 identifies a GDEV other than the migration-source GDEV in which migration-targeted volume data had been stored until the expiration of the time period. Specifically, for example, the data management apparatus 50 references the identical-data management table 903, acquires the identical-data management ID 1204 of the migration-source GDEV, and identifies the WWN # 1201 and the LUN # 1202 of the GDEV other than the migration-source GDEV from among the GDEV comprising the acquired identical-data management ID. Then, the data management apparatus 50 references the storage management table 905 and acquires the storage ID 1403 of the storage apparatus 30 constituting the basis of the identified GDEV based on the WWN and the LUN corresponding to the identified GDEV. In the following explanation, it is supposed that the GDEV identified in this step is the backup GDEV.

In Step S3102, the data management apparatus 50 sends the migration-source storage apparatus 30 an instruction to delete the volume data in the LU corresponding to the migration-source GDEV. The data management apparatus 50 also sends the storage apparatus 30, which constitutes the basis of the backup GDEV, that is, the storage apparatus 30 having the storage ID 1403 acquired in Step S3101, an instruction to delete the volume data from the LU corresponding to the backup GDEV.

In Step S3103, the migration-source storage apparatus 30 deletes the volume data stored in the LU corresponding to the migration-source GDEV. Then, the migration-source storage apparatus 30 issue a notification to the data management apparatus 50 to the effect that the deletion of the volume data has been completed. The storage apparatus 30 constituting the basis of the backup GDEV deletes the volume data stored in the LU corresponding to the backup GDEV. Then, the storage apparatus 30 constituting the basis of the backup GDEV issues a notification to the data management apparatus 50 to the effect that the deletion of the volume data has been completed.

In Step S3104, the data management apparatus 50 ends the processing upon receiving the notifications from both the migration-source storage apparatus 30 and the storage apparatus 30 constituting the basis of the backup GDEV to the effect that the deletion of the volume data has been completed.

According to the processing described above, the same effect as that of Example 1 is achieved. Processing can be performed while running the host 10 continuously in a case where the volume data protection level is changed as well. Processing can also be performed without having to rely on the OS and application software configured in each host 10.

In Example 2, a case was explained in which, in addition to the GDEV performance and bit cost, the volume data is changed from duplicate to single (a change in the protection level) subsequent to the time period. For example, in a case where only the volume data is changed from duplicate to single without changing the performance and bit cost of the GDEV, it is enough to simply identify the backup GDEV and delete the volume data from the backup GDEV.

Examples of the present invention have been explained hereinabove, but it goes without saying that the present invention is not limited to the above examples, and that various changes are possible without departing from the gist thereof.

For example, the logical volume provided to the host 10 for storing volume data may be a virtual logical volume (a virtual volume), which conforms to technology (for example, Thin Provisioning) for dynamically expanding capacity. In accordance with this, the virtual volume comprises multiple virtual areas (virtual storage areas). A capacity pool is formed using an aggregate of one or more LUs. A LU, which comprises the capacity pool, will be referred to as a pool LU hereinafter. The capacity pool comprises multiple real areas (substantial storage areas). A real area, for example, is a component of the pool LU, and the pool LU is partitioned into two or more real areas.

The storage system 40, upon receiving a write request specifying the virtual volume from the edge storage 20, selects an unallocated real area from multiple real areas in the capacity pool, and allocates the selected real area to a write-destination virtual area (the virtual area to which an address specified in the write request belongs). Then, the storage system 40 writes write-target data conforming to the write request to the real area allocated to the write-destination virtual area. The storage system 40 stores mapping information denoting which real areas of the capacity pool are allocated to which virtual areas of the virtual volume in a storage resource such as a memory. In a case where a write request has been received, the storage system 40 updates the mapping information so as to associate the write-destination virtual area identified from the write request with the allocated real area.

In a case where the volume data stored in a migration-source GDEV corresponding to this virtual volume is migrated to a migration-destination GDEV, based on the mapping information, only the data of the virtual area to which the real area is allocated is migrated to the migration-destination GDEV, and, in addition, mapping information may be created in the migration-destination GDEV. The mapping information may be migrated as-is in a case where the same corresponding relationship between the virtual area and the real area in the migration-source GDEV can be constructed in the migration-destination GDEV.

REFERENCE SIGNS LIST

10 Host computer
20 Edge storage apparatus
30 Storage apparatus
40 Storage system
50 Data management apparatus
100 Data management system

The invention claimed is:

1. A computer system, comprising:
   one or more host computers;
   one or more storage systems, which comprise multiple storage apparatuses comprising one or more physical storage devices and one or more logical units, which are based on the one or more the physical storage devices;
   one or more edge storage apparatuses, which are coupled between the one or more host computers and the one or more storage systems, wherein each host computer is coupled to each edge storage apparatus on a one-to-one basis;

a data management apparatus for managing volume data stored in the one or more logical units of the multiple storage apparatuses of the one or more storage systems, wherein a storage device of the data management apparatus is configured to:

store a retention rule for the volume data, the retention rule comprises change-time identification information for identifying point-in-time for changing the one or more logical units, which constitutes a volume data retention destination, migration-destination unit specification information for specifying a migration-destination logical unit for the volume data;

a storage device of the edge storage apparatus configured to:

store first identification information enabling the host computer to identify the volume data of the one or more logical units, and store second identification information enabling the host computer to identify the one or more logical units for storing the volume data in the storage system after associating the first identification information and the second identification information with each other;

a migration-source storage apparatus that includes one or more migration source logic units and a control device of the migration-source storage apparatus, wherein the one or more migration source logic units are configured to store the volume data and the control device of the migration-source storage apparatus is configured to:

store write data slated for volume data in a case where a write request with respect to the volume data in a migration-source logical unit has been received, subsequent to starting a transfer of the volume data at a first point-in-time to the one or more migration-destination logical units, and reflect the write data in the volume data of the migration-destination logical unit after the transfer of the volume data at the first point-in-time to the migration-destination logical unit has ended;

a control device of the data management apparatus configured to:

locate the migration-destination logical unit based upon a bit cost, wherein the migration-destination logical unit conforms to the migration-destination unit specification information at or after a point in time when the specification is implemented in accordance with the change-time identification information, issue a write request suspend instruction after the transfer of the volume data at the first point-in-time to the migration-destination logical unit has ended but prior to the reflection of the write data in the volume data of the migration destination logical unit, this instruction instructing the edge storage apparatus not to send to the storage system a write request with respect to the volume data in the migration-source logical unit, and transfer the volume data from the migration-source logical unit to the migration-destination logical unit; and a control device of the edge storage apparatus configured to:

associate the second identification information, which enables the identification of the migration-destination logical unit, with the first identification information, which enables the identification of the volume data, store write data slated for volume data in a storage device of the edge storage apparatus in a case where a write request with respect to the volume data in the migration-source logical unit is received after having received the write request suspend instruction, after the reflection of the write data in the volume data of the migration destination logical unit has been completed, reflect in the volume data of the migration-destination logical unit the write data stored in the storage device of the edge storage apparatus, and store the associated information in the storage device of the edge storage apparatus.

2. The computer system according to claim 1, further comprising:

wherein the control device of the migration-source storage apparatus is further configured to:

upon receiving a delete instruction, delete the volume data from the one or more migration-source logical units, wherein the control device of the edge storage apparatus is further configured to:

perform the association of the second identification information prior to the reflection in the volume data of the migration-destination logical unit the write data stored in the storage device of the edge storage apparatus.

3. The computer system according to claim 2, wherein the control device of the data management apparatus is further configured to:

after transferring the volume data of the migration-source logical unit to the migration-destination logical unit, send the delete instruction for deleting the volume data of the one or more migration-source logical unit to the storage apparatus.

4. The computer system according to claim 1, wherein the control device of the data management apparatus is further configured to:

receive the retention rule for the volume data, and stores the retention rule in the storage device of the data management apparatus.

5. The computer system according to claim 1, wherein the migration-destination unit specification information comprises information related to either performance or the bit cost of the one or more logical units.

6. The computer system according to claim 1, wherein the retention rule comprises information related to multiplexing of the volume data.

7. The computer system according to claim 1, wherein the retention rule comprises migration-source logical unit specification information for specifying one of the one or more logical units in which the volume data is stored prior to changing a value identifying a volume data retention-destination logical unit, and wherein the control device of the data management apparatus is further configured to:

retrieve a retrieved logical unit from the one of the one or more logical units conforming to the migration-source logical unit specification information, and treats the retrieved logical unit as the logical unit for retaining the volume data.

8. A data management apparatus, which is provided in a computer system, which comprises one or more host computers, one or more storage systems comprising multiple storage apparatuses having one or more physical storage devices and one or more logical units based on the one or more the physical storage devices, and one or more edge storage apparatuses that are coupled between the one or more host computers and the one or more storage systems, wherein each host computer is coupled to one edge storage apparatus, and which is for managing volume data stored in the one or more logical units of the multiple storage apparatuses of the one or more storage systems, the data management apparatus comprising:
a storage device; and
a control device, coupled to the storage device;
a migration-source storage apparatus that includes one or more migration-source logical units, wherein the one or more migration logical units are configured to store the volume data;
wherein the storage device stores a retention rule for the volume data, the retention rule comprises change-time identification information for identifying a point-in-time for changing the one or more logical units, which constitutes a volume data retention destination, and migration-destination unit specification information for specifying a migration-destination logical unit for the volume data,
wherein the control device is configured to:
  locate one or more migration-destination logical units based upon a bit cost, wherein the one or more migration-destination logical units conform to the migration-destination unit specification information at or after a point in time when the specification is implemented in accordance with the change-time identification information;
  subsequent to the point-in-time identified in accordance with the change-time identification information, transfer the volume data from the one or more migration-source logical units to the one or more migration-destination logical units;
  associate second identification information, which enables the identification of the one or more migration-destination logical units, with first identification information, which enables the identification of the volume data in the edge storage apparatus, and store associated information in the storage device of the edge storage apparatus,
  store write data slated for volume data in a case where a write request with respect to the volume data in the one or more migration-source logical units has been received in a migration-source storage apparatus, subsequent to starting transfer of the volume data at a first point-in-time to the one or more migration-destination logical units:
  reflect the write data in the volume data of the one or more migration-destination logical units after the transfer of the volume data at the first point-in-time to the one or more migration-destination logical units has ended in the migration-source storage apparatus, and
  after the transfer of the volume data at the first point-in-time to the migration-destination logical unit has ended, but prior to the reflection of the write data in the volume data of the migration-destination logical unit, issue to the edge storage apparatus a write request suspend instruction to prevent a write request with respect to the volume data in the migration-source logical unit from being sent to the storage system, and, in addition, to store write data with respect to the volume data in a storage device of the edge storage apparatus in a case where a write request with respect to volume data in the migration-source logical unit has been received.

9. A data management method for a computer system, which comprises one or more host computers, one or more storage systems comprising multiple storage apparatuses having one or more physical storage devices and one or more logical units based on the one or more the physical storage devices, and one or more edge storage apparatuses, which are coupled between the host computer and the storage, wherein each host computer is coupled to one edge storage apparatus, and a data management apparatus for managing volume data stored in the one or more logical units of the multiple storage apparatuses of the one or more storage systems,
  the data management method comprising: storing a retention rule with respect to the volume data,
  wherein the retention rule comprises change-time identification information for identifying a point-in-time for changing the one or more logical units, which constitutes a volume data retention destination, and migration-destination unit specification information for specifying a migration-destination logical unit for the volume data,
  the data management method further comprising:
  locating one or more migration-destination logical units based upon a bit cost, wherein the one or more migration-destination logical units conform to the migration-destination unit specification information at or after a point in time when the specification is implemented in accordance with the change-time identification information;
  transferring the volume data from one or more migration-source logical units to the one or more migration-destination logical units;
  associating in the storage system by the host computer, second identification information, which enables the identification of the one or more migration-destination logical units, with first identification information, which enables the identification of the volume data in the edge storage apparatus, and stores associated information in the storage device of the edge storage apparatus;
  storing write data slated for volume data in a case where a write request with respect to the volume data in the one or more migration-source logical units has been received, subsequent to starting transfer of the volume data at a first point-in-time to the one or more migration-destination logical units;
  reflecting the write data in the volume data of the one or more migration-destination logical units after the transfer of the volume data at the first point-in-time to the one or more migration-destination logical units has ended;
  issuing a write request suspend instruction after the transfer of the volume data at the first point-in-time to the migration-destination logical unit has ended, but prior to reflecting the write data in the volume data of the migration-destination logical unit, with this instruction being issued to instruct the edge storage apparatus not to send to the storage system a write request with respect to the volume data in the one or more migration-source logical units;
  in a case where a write request with respect to volume data in the one or more migration-source logical units is received after having received the write request suspend instruction, storing in a storage device of the edge storage apparatus, write data slated for the volume data; and
  reflecting the write data stored in the storage device of the edge storage apparatus in the volume data of the one or more migration-destination logical units after reflecting the write data in the volume data of the one or more migration-destination logical units has been completed.

* * * * *